US009815985B2

(12) United States Patent
Naskar et al.

(10) Patent No.: US 9,815,985 B2
(45) Date of Patent: Nov. 14, 2017

(54) HIGH PERFORMANCE LIGNIN-ACRYLONITRILE POLYMER BLEND MATERIALS

(71) Applicant: UT-Battelle, LLC, Oak Ridge, TN (US)

(72) Inventors: Amit K. Naskar, Knoxville, TN (US); Chau D. Tran, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 14/798,729

(22) Filed: Jul. 14, 2015

(65) Prior Publication Data

US 2017/0015828 A1  Jan. 19, 2017

(51) Int. Cl.
| | |
|---|---|
| C08L 97/00 | (2006.01) |
| C08L 9/02 | (2006.01) |
| C08J 3/00 | (2006.01) |
| C08L 9/00 | (2006.01) |
| C08L 9/06 | (2006.01) |
| C08L 33/20 | (2006.01) |

(52) U.S. Cl.
CPC ............. *C08L 97/005* (2013.01); *C08J 3/005* (2013.01); *C08L 9/00* (2013.01); *C08L 9/02* (2013.01); *C08L 9/06* (2013.01); *C08L 97/00* (2013.01); *C08J 2309/02* (2013.01); *C08J 2397/00* (2013.01); *C08J 2409/02* (2013.01); *C08L 33/20* (2013.01)

(58) Field of Classification Search
CPC .................................................. C08L 97/005
USPC ........................................................ 524/72
See application file for complete search history.

(56) References Cited

U.S. PATENT DOCUMENTS

| | | | |
|---|---|---|---|
| 2,341,553 | A | 2/1944 | Houtz |
| 2,608,537 | A | 8/1952 | Pollak |
| 2,635,976 | A | 4/1953 | Meiler et al. |
| 2,911,383 | A | 11/1959 | Doughty et al. |
| 3,167,523 | A | 1/1965 | Dimitri |
| 3,230,201 | A | 1/1966 | Hart et al. |
| 3,892,720 | A | 7/1975 | Jahnke |
| 4,260,702 | A | 4/1981 | Schultz et al. |
| 5,006,603 | A | 4/1991 | Takaki et al. |
| 5,196,460 | A | 3/1993 | Lora et al. |
| 5,229,202 | A | 7/1993 | Tomono et al. |
| 5,302,666 | A | 4/1994 | Hino et al. |
| 5,534,235 | A | 7/1996 | Reed et al. |
| 6,103,865 | A | 8/2000 | Bae et al. |
| 6,555,617 | B1 | 4/2003 | Tanaka et al. |
| 8,445,141 | B2 | 5/2013 | Kitamura et al. |
| 8,637,174 | B2 | 1/2014 | Häring et al. |
| 8,748,537 | B2 | 6/2014 | Naskar et al. |
| 9,453,129 | B2 * | 9/2016 | Naskar .................. C08L 97/005 |
| 2006/0116436 | A1 | 6/2006 | Okamitsu et al. |
| 2006/0258836 | A1 | 11/2006 | McGrath et al. |
| 2012/0003471 | A1 | 1/2012 | Bissett et al. |
| 2013/0084455 | A1 | 4/2013 | Naskar et al. |
| 2013/0116383 | A1 | 5/2013 | Naskar et al. |
| 2013/0214442 | A1 | 8/2013 | Naskar |
| 2014/0045996 | A1 | 2/2014 | Naskar et al. |

FOREIGN PATENT DOCUMENTS

| | | |
|---|---|---|
| CN | 1781980 A | 6/2006 |
| CN | 103351491 A1 | 10/2013 |
| CN | 103361025 A | 10/2013 |
| JP | 2010-111785 A | 5/2010 |
| WO | WO 2013/156996 A1 | 10/2013 |
| WO | WO 2013/156997 A1 | 10/2013 |
| WO | WO 2015/200159 A1 | 12/2015 |

OTHER PUBLICATIONS

Achary P.S. et al., "Reactive Compatibilization of a Nitrile Rubber/Phenolic Resin Blend: Effect on Adhesive and Composite Properties", *Journal of Applied Polymer Science* 69:1187-2101 (1998).

Cui C. et al., "Toward Thermoplastic Lignin Polymers; Part II: Thermal & Polymer Characteristics of Kraft Lignin & Derivatives", *BioResources* 8(1):864-886 (2013).

Sadeghifar H. et al., "Toward Thermoplastic Lignin Polymers. Part 1. Selective Masking of Phenolic Hydroxyl Groups in Kraft Lignins Via Methylation and Oxypropylation Chemistries", *Industrial & Engineering Chemistry Research* 51(51):16713-16720 (2012).

Saito T. et al., "Development of Lignin-Based Polyurethane Thermoplastics", *RSC Advances* 3:21832-21840 (2013).

Saito T. et al., "Turning Renewable Resources into Value-Added Polymer: Development of Lignin-Based Thermoplastic", *Green Chemistry* 14:3295-3303 (2012).

"Fully Bio-Based Thermoplastic Lignin Composites", Biomaterials-Towards Industrial Applications Källe Nättinen, Antti Ojala, Lisa Wikström, VTT Technical Research Centre of Finland (20 pages) (May 22, 2013).

International Search Report dated Sep. 14, 2015 issued in PCT/US2015/036873.

U.S. Office Action dated Oct. 26, 2015 issued in U.S. Appl. No. 14/311,893.

(Continued)

*Primary Examiner* — Edward Cain
(74) *Attorney, Agent, or Firm* — Scully Scott Murphy & Presser

(57) ABSTRACT

A polymer blend material comprising: (i) a lignin component having a weight-average molecular weight of up to 1,000,000 g/mol; and (ii) an acrylonitrile-containing copolymer rubber component comprising acrylonitrile units in combination with diene monomer units, and having an acrylonitrile content of at least 20 mol %; wherein said lignin component is present in an amount of at least 5 wt % and up to about 95 wt % by total weight of components (i) and (ii); and said polymer blend material possesses a tensile yield stress of at least 5 MPa, or a tensile stress of at least 5 MPa at 10% elongation, or a tensile stress of at least 5 MPa at 100% elongation. Methods for producing the polymer blend, molded forms thereof, and articles thereof, are also described.

38 Claims, 25 Drawing Sheets

(56) References Cited

OTHER PUBLICATIONS

Tran, C.D. et al., "A New Class of Renewable Thermoplastics with Extraordinary Performance from Nanostructured Lignin-Elastomers", Adv. Funct. Mater., (2016), vol. 26, pp. 2677-2685.
International Search Report dated Oct. 12, 2016 issued in PCT/US2016/041984.

* cited by examiner

HIGH PERFORMANCE LIGNIN-ACRYLONITRILE POLYMER BLEND MATERIALS

This invention was made with government support under Prime Contract No. DE-AC05-00OR22725 awarded by the U.S. Department of Energy. The government has certain rights in the invention.

FIELD OF THE INVENTION

The present invention relates generally to polymer blend compositions, and more particularly, to such compositions having useful characteristics in such properties as tensile strength, elasticity, and toughness.

BACKGROUND OF THE INVENTION

Numerous structural polymeric materials available today are characterized by either good mechanical (i.e., tensile) strength or good elongation (toughness), but typically not having a combination of these two characteristics that result in a robust or rugged (i.e., strong yet tough) material. Materials having such improved physical characteristics would be useful and advantageous in numerous applications, including in critical structural and impact resistant applications where high loads or sudden mechanical stresses are encountered. In such applications, materials with high tensile strength but low toughness are prone to failure by virtue of their brittleness. Materials that possess a high tensile strength or high tensile stress along with improved elongation properties would be much less prone to such failure.

SUMMARY OF THE INVENTION

The instant disclosure is directed foremost to high performance polymer blend materials containing at least a lignin component and an acrylonitrile-containing copolymer component, as well as composites thereof, useful as industrial plastic resins and structural materials for a number of applications. The polymer blends described herein are generally characterized by a combination of beneficial mechanical properties (e.g., high strength or tensile stress and moderate or high elasticity) that make them particularly useful in critical structural applications where high loads or mechanical stresses are encountered. In some embodiments, the polymer blends described herein are thermoplastic, which advantageously provide them with a sufficient degree of moldability, elasticity, recyclability, and/or ductility to mold them into a variety of useful shapes. In other embodiments, the polymer blends described herein exhibit characteristics of a thermoset elastomer or toughened plastic.

In more specific embodiments, the polymer blend material includes: (i) a lignin component having a weight-average molecular weight of up to 1,000,000 g/mol; and (ii) an acrylonitrile-containing copolymer rubber component that includes acrylonitrile units in combination with diene (e.g., butadiene) units, and having an acrylonitrile content of at least 20 mol %. Generally, the lignin component is present in an amount of at least 5 wt % and up to about 95 wt % by total weight of components (i) and (ii). Preferably, the polymer blend material possesses a tensile yield stress of at least 5 MPa, or a tensile stress of at least 5 MPa at an elongation of 10%. In an exemplary composition of the instant disclosure, the polymer blend material possesses an ultimate elongation (elongation at break) of at least or greater than 50% or 100%. In some embodiments, the polymer blend material possesses a tensile stress of at least 5 MPa at an elongation of 100%. In a specific exemplary formulation of the instant disclosure, the polymer blend material behaves as an elastomer with about 14 MPa of tensile strength and about 230% of elongation at break. In another exemplary formulation of the instant disclosure, the polymer blend material behaves as a toughened plastic with about 32 MPa and 160% of elongation at break. In yet another exemplary formulation of the instant disclosure, the polymer blend material behaves as a thermoplastic elastomer that exhibits mechanical properties in between the two aforementioned formulations.

The instant disclosure is also directed to methods for producing the above-described polymer blend materials described above. In particular embodiments, the method includes homogeneously blending a mixture that includes components (i) and (ii) at a temperature of at least 100° C. and up to 200° C., at a shear rate of 10 to 1000 s$^{-1}$, and for a time of 5 to 45 minutes. In the method, the lignin component is preferably present in an amount of at least 5 wt % and up to about 95 wt % by total weight of components (i) and (ii) to achieve the same weight ratio of components in the product. Equipment useful for such mixing include an internal mixer, a two roll-mill, or an extruder. The method may also include a molding process, which may include any of the shaping, heating, pressing and/or printing processes known in the art, to produce a shaped or printed article of the polymer blend material.

Aside from the advantages provided by the superior physical properties of the instantly described polymer blend materials, the instant invention provides additional advantages related to its use of lignin. In particular, lignin is a byproduct in the pulp processing industry and biorefinery, and usually considered a low-valued material. Due to its natural abundance and aromatic structure, the conversion of lignin to high-value products presents a potential pathway for reducing the carbon footprint in the environment and furthermore improves the financial outlook of the paper and biofuel industries. Lignin is used as feedstock for the production of many compounds, such as vanillin, phenol, and ferrulic acid via depolymerization and chemical reactions. However, the demand for such products is not large enough to fulfill large scale utilization of lignin. Lignin is expected to play a more significant role in polymer applications, where demand for replacing fossil-based resins by an eco-friendly material like lignin is much greater.

There have been significant attempts to produce high performance lignin-based polymer composites. However, the incompatibility between lignin and polymer matrices has long prevented the successful utilization of lignin as a low cost reinforcement. Moreover, the efforts of the art have thus far focused on thermosetting polymer composites, which are not recyclable. Generally, the conventional process has compensated for these drawbacks by using a low volume fraction of lignin in order to avoid the significant reduction of mechanical properties.

Herein is reported the unique utilization of lignin by physically interacting or chemically reacting lignin with an acrylonitrile-containing copolymer. The process described herein can advantageously use a much higher weight ratio of lignin than conventionally used in the art (e.g., at least 30%, 40%, or even 50%), and can also advantageously dispense with the use of additives or modifying agents generally used for improving tensile strength, while at the same time producing a polymer blend material with exceptional physical properties, such as high strength or tensile stress along with moderate to high elasticity. The described process can also advantageously dispense with a solvent, which makes the process even more eco-friendly. Moreover, the method can advantageously be adjusted in a variety of aspects to selectively produce a polymer blend with a particularly desired combination of physical properties, such as tensile strength, tensile yield stress, elastic modulus, and elongation properties. For example, by judicious selection of the type of nitrile polymer (including acrylonitrile content), type of lignin (including chemical functionalities and/or molecular weight), weight ratios of the components, mixing conditions (e.g., shear rate), processing temperature, and processing time, a variety of polymer blend materials improved or optimized in one or more mechanical properties can be achieved. The instant method is particularly unique in its ability to produce different types of materials, including elastomers, thermoplastics, and thermoplastic elastomers, by careful selection of such variables, particularly the ratio of the two components.

A further advantage of the instant method is that it does not require chemical functionalization of lignin for bonding with the acrylonitrile copolymer prior to melt-extrusion based processing. In other words, the instant process can produce a polymer blend material with exceptional physical properties by melt processing of only the lignin and acrylonitrile copolymer components (i.e., a binary mixture) under the above-described conditions involving temperature, shear rate, processing time, acrylonitrile content, and weight ratios of components, without employing chemical functionalization of lignin for bonding with the acrylonitrile copolymer and without incorporation of a modifying agent (e.g., carbon particles, silica or silicate particles, ether-containing polymers, plasticizers, and Lewis acid compounds) for imparting improved physical properties.

DETAILED DESCRIPTION OF THE INVENTION

Figure 1:
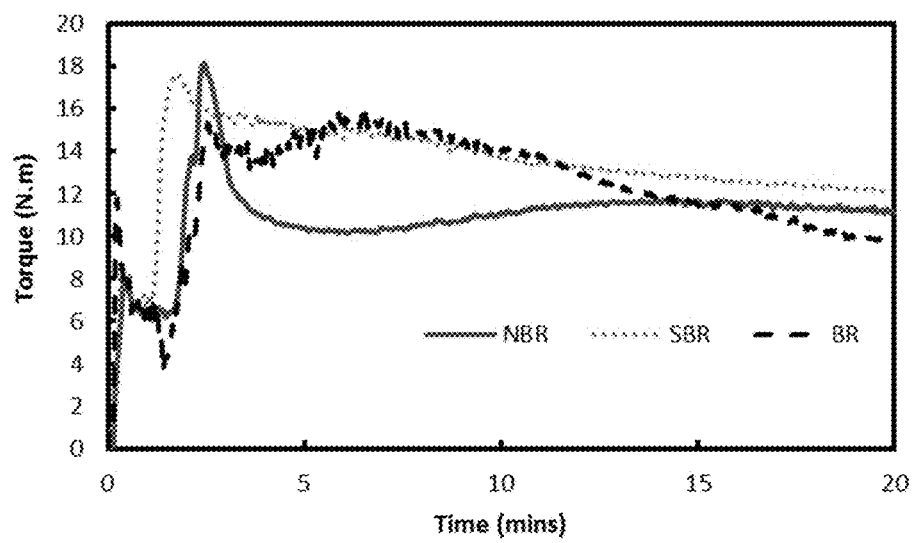
FIG. 1. Graph plotting torque vs. time (i.e., evolution of torque) during reactive or interactive mixing of three different rubbers with Kraft processed softwood lignin A (SW-A) prepared by mixing equal parts by weight of the lignin and rubber.

In a first aspect, the instant disclosure is directed to a polymer blend material that includes: (i) a lignin component having a weight-average molecular weight of up to 1,000,000 g/mol; and (ii) an acrylonitrile-containing copolymer rubber component comprising acrylonitrile units in combination with diene monomer units (e.g., butadiene or isoprene), and having an acrylonitrile content of at least 20 mol %. The term "polymer blend," as used herein, refers to a solid solution in which discrete microscopic regions of components (i) and/or (ii) are present. The polymer blend may exhibit substantial integration (i.e., near homogeneous) at the microscale or approaching the molecular level, but without losing each component's identity. Generally, one of the components (i) or (ii) functions as a matrix in which domains (i.e., particles or microscopic regions) of the other component (i) or (ii) are dispersed. In particular embodiments of the polymer blend material, the acrylonitrile-containing copolymer component (ii) functions as a matrix in which the lignin component (i) is dispersed in the form of domains having any of the exemplary sizes provided hereinbelow. The domains are generally up to or less than 100 microns (100 μm) in size. In different embodiments, the domains are up to or less than, for example, 50 μm, 10 μm, 5 μm (5000 nm), 2 μm (2000 nm), 1 μm (1000 nm), 800 nm, 500 nm, 200 nm, 100 nm, 50 nm, 25 nm, 10 nm, or 5 nm. Any of the above exemplary domain sizes may alternatively represent a mean or median domain size, as found in a particle size distribution curve. For example, in some embodiments, at least 80%, 85%, 90%, or 95% of the domains have a size up to or less than any exemplary values provided above. In some embodiments, substantially all (e.g., above 95%) or all (i.e., 100%) of the domains have a size up to or less than any exemplary values provided above.

The lignin component, i.e., component (i), can be any of the wide variety of lignin compositions found in nature in lignocellulosic biomass and as known in the art. As known in the art, the lignin compositions found in nature are generally not uniform. Lignin is a random copolymer that shows significant compositional variation between plant species. Many other conditions, such as environmental conditions, age, and method of processing, influence the lignin composition. Lignins differ mainly in the ratio of three alcohol units, i.e., p-coumaryl alcohol, guaiacyl alcohol, and sinapyl alcohol. The polymerization of p-coumaryl alcohol, coniferyl alcohol, and sinapyl alcohol forms the p-hydroxyphenyl (H), guaiacyl (G) and syringyl (S) components of the lignin polymer, respectively. The precursor lignin can have any of a wide variety of relative weight percents (wt %) of H, G, and S components. As observed in some seeds, lignin may also consist of caffeyl alcohol units, e.g., Chen et al. PNAS, 109(5), 1772-1777 (2012). For example, the precursor lignin may contain, independently for each component, at least, up to, or less than 1 wt %, 2 wt %, 5 wt %, 10 wt %, 20 wt %, 30 wt %, 40 wt %, 50 wt %, 60 wt %, 70 wt %, 80 wt %, or 90 wt %, or within a range thereof, of any of the caffeyl alcohol, H, G, and S components. Typically, the sum of the wt % of each alcohol component is 100%, or at least 98% if other minor components are considered. Different wood and plant sources (e.g., hardwood, softwood, poplar wood, or grass-derived lignins, such as switchgrass, corn, bamboo, perennial grass, orchard grass, alfalfa, wheat, and bagasse) often widely differ in their lignin compositions, and are all considered herein as sources of lignin. In some embodiments, depending on the desired characteristics of the polymer blend material, any one or more types of lignin, as described above, may be excluded from the polymer blend material.

Besides the natural variation of lignins, there can be further compositional variation based on the manner in which the lignin has been processed. For example, the precursor lignin can be a Kraft lignin, sulfite lignin (i.e., lignosulfonate), or a sulfur-free lignin. As known in the art, a Kraft lignin refers to lignin that results from the Kraft process. In the Kraft process, a combination of sodium hydroxide and sodium sulfide (known as "white liquor") is reacted with lignin present in biomass to form a dark-colored lignin bearing thiol groups. Kraft lignins are generally water- and solvent-insoluble materials with a high concentration of phenolic groups. They can typically be made soluble in aqueous alkaline solution. As also known in the art, sulfite lignin refers to lignin that results from the sulfite process. In the sulfite process, sulfite or bisulfite (depending on pH), along with a counterion, is reacted with lignin to form a lignin bearing sulfonate ($SO_3H$) groups. The sulfonate groups impart a substantial degree of water-solubility to the sulfite lignin. There are several types of sulfur-free lignins known in the art, including lignin obtained from biomass conversion technologies (such as those used in ethanol production), solvent pulping (i.e., the "organosolv" process), and soda pulping. In particular, organosolv lignins are obtained by solvent extraction from a lignocellulosic source, such as chipped wood, followed by precipitation. Due to the significantly milder conditions employed in producing organosolv lignins (i.e., in contrast to Kraft and sulfite processes), organosolv lignins are generally more pure, less degraded, and generally possess a narrower molecular weight distribution than Kraft and sulfite lignins. These lignins can also be thermally devolatilized to produce a variant with less aliphatic hydroxyl groups, and molecularly restructured forms with an elevated softening point. Any one or more of the foregoing types of lignins may be used (or excluded) as a component in the method described herein for producing a polymer blend.

The lignin may also be an engineered form of lignin having a specific or optimized ratio of H, G, and S components. Lignin can be engineered by, for example, transgenic and recombinant DNA methods known in the art that cause a variation in the chemical structure in lignin and overall lignin content in biomass (e.g., F. Chen, et al., *Nature Biotechnology*, 25(7), pp. 759-761 (2007) and A. M. Anterola, et al., *Phytochemistry*, 61, pp. 221-294 (2002)). The engineering of lignin is particularly directed to altering the ratio of G and S components of lignin (D. Guo, et al., *The Plant Cell*, 13, pp. 73-88, (January 2001). In particular, wood pulping kinetic studies show that an increase in S/G ratio significantly enhances the rate of lignin removal (L. Li, et al., *Proceedings of The National Academy of Sciences of The United States of America*, 100 (8), pp. 4939-4944 (2003)). The S units become covalently connected with two lignol monomers; on the other hand, G units can connect to three other units. Thus, an increased G content (decreasing S/G ratio) generally produces a highly branched lignin structure with more C—C bonding. In contrast, increased S content generally results in more β-aryl ether (β-O-4) linkages, which easily cleave (as compared to C—C bond) during chemical delignification, e.g., as in the Kraft pulping process. It has been shown that decreasing lignin content and altering the S/G ratio improve bioconvertability and delignification. Thus, less harsh and damaging conditions can be used for delignification (i.e., as compared to current practice using strong acid or base), which would provide a more improved lignin better suited for higher value-added applications, including manufacturing of tough polymer blends, carbon materials production (e.g., carbon fiber, carbon powder, activated carbon, microporous and mesoporous carbon) and pyrolytic or catalytic production of aromatic hydrocarbon feedstock.

Lab-scale biomass fermentations that leave a high lignin content residue have been investigated (S. D. Brown, et al., *Applied Biochemistry and Biotechnology*, 137, pp. 663-674 (2007)). These residues will contain lignin with varied molecular structure depending on the biomass source (e.g., wood species, grass, and straw). Production of value-added products from these high quality lignins would greatly improve the overall operating costs of a biorefinery. Various chemical routes have been proposed to obtain value-added products from lignin (J. E. Holladay, et al., Top Value-Added Chemicals from Biomass: Volume II—Results of Screening for Potential Candidates from Biorefinery Lignin, DOE Report, PNNL-16983 (October 2007)).

The lignin may, in some embodiments, be a crosslinked lignin that is melt-processable or amenable to melt-processing. The term "crosslinked" can mean, for example, that the lignin contains methylene (i.e., —$CH_2$—) and/or ethylene (i.e., —$CH_2CH_2$—) linkages (i.e., linking groups) between phenyl ring carbon atoms in the lignin structure. By being "melt-processible" is meant that the crosslinked lignin can be melted or converted to a molten, highly viscous, or rubbery state starting at a particular glass transition temperature. The melted or highly viscous lignin can then be more easily processed, such as by mixing, molding, applying on a surface, or dissolving in a solvent. In some embodiments, the lignin is not crosslinked. In particular embodiments, the lignin component exhibits a suitable steady shear viscosity to render it as a malleable film-forming material at the processing temperature and shear rate employed. Typically, at a melt processing condition, the steady shear viscosity of the lignin component is at least or above 100 Pa·s, 500 Pa·s, or 1000 Pa·s, or within a range therein. In some embodiments, the lignin may be oxidized (e.g., by exposure to chemical oxidizing agent), while in other embodiments, the lignin is not oxidized. In some embodiments, the lignin is chemically unmodified relative to its natural extracted or isolated form. In some embodiments, the lignin is chemically modified by acetylation, oxypropylation, hydroxymethylation, epoxidation, or the like, as known in the art. In some embodiments, the lignin is plasticized with solvents or plasticizers to induce melt-processability. Solvents and plasticizers include, for example, dimethylsulfoxide, dimethylacetamide, polyoxyalkylene, and glycerol, as known in the art. In some embodiments, the use of a solvent or plasticizer is excluded.

For purposes of the instant invention, the lignin has a number-average or weight-average molecular weight (i.e., $M_n$ or $M_w$, respectively) of about, up to, or less than 300, 500, 1,000, 3,000, 5,000, 8,000, 10,000, 50,000, 100,000, 500,000 or 1,000,000 g/mol, [G. Fredheim, et al., J. Chromatogr. A, 2002, 942, 191; and A. Tolbert, et al., Biofuels, Bioproducts & Biorefining 8(6) 836-856 (2014)] wherein the term "about" generally indicates no more than ±10%, ±5%, or ±1% from an indicated value. The glass transition temperature ($T_g$) of the crosslinked lignin is generally above room temperature (typically, 15, 20, 25, or 30° C.). In different embodiments, the lignin (either isolated lignin from biomass or its crosslinked derivative) has a glass transition temperature of precisely, about, at least, or greater than 40° C., 50° C., 60° C., 70° C., 80° C., 90° C., 100° C., 105° C., 110° C., 115° C., 120° C., 125° C., 130° C., 140° C., 150° C., 160° C., 170° C., 180° C., 190° C., 200° C., 210° C., 220° C., 230° C., 240° C., or 250° C., or a $T_g$ within a range bounded by any two of the foregoing values. The polymer blend material in which the lignin is incorporated may also possess any of the glass transition temperatures or ranges thereof provided above.

The lignin (in either raw form isolated from biomass or its crosslinked derivative) may be substantially soluble in a polar organic solvent or aqueous alkaline solution. As used herein, the term "substantially soluble" generally indicates that at least 1, 2, 5, 10, 20, 30, 40, 50, or 60 grams of the lignin completely dissolves in 1 deciliter (100 mL) of the polar organic solvent or aqueous alkaline solution. In other embodiments, the solubility is expressed as a wt % of the lignin in solution. In some embodiments, the lignin has sufficient solubility to produce at least a 5 wt %, 10 wt %, 15 wt %, 20 wt %, 30 wt %, 40 wt %, or 50 wt % solution in the polar organic solvent or aqueous alkaline solution. The polar organic solvent can be aprotic or protic. Some examples of polar aprotic solvents include the organoethers (e.g., diethyl ether, tetrahydrofuran, and dioxane), nitriles (e.g., acetonitrile, propionitrile), sulfoxides (e.g., dimethylsulfoxide), amides (e.g., dimethylformamide, N,N-dimethylacetamide), organochlorides (e.g., methylene chloride, chloroform, 1,1,-trichloroethane), ketones (e.g., acetone, 2-butanone), and dialkylcarbonates (e.g., ethylene carbonate, dimethylcarbonate, diethylcarbonate). Some examples of polar organic protic solvents include the alcohols (e.g., methanol, ethanol, isopropanol, n-butanol, t-butanol, the pentanols, hexanols, octanols, or the like), diols (e.g., ethylene glycol, diethylene glycol, triethylene glycol), and protic amines (e.g., ethylenediamine, ethanolamine, diethanolamine, and triethanolamine). The aqueous alkaline solution can be any aqueous-containing solution having a pH of at least (or over) 8, 9, 10, 11, 12, or 13. The alkalizing solute can be, for example, an alkali hydroxide (e.g., NaOH or KOH), ammonia, or ammonium hydroxide. Combinations of any of these solvents may also be used. In some embodiments, the lignin is dissolved in a solvent, such as any of the solvents described above, when used to form the polymer blend. The solvent may or may not be incorporated into the final polymer blend material. In some embodiments, one or more classes or specific types of solvents are excluded from any of the components (i) or (ii) or from the polymer blend material altogether.

The acrylonitrile-containing copolymer rubber component, i.e., component (ii), is constructed of (i.e., derived from) at least acrylonitrile units and diene monomer units. The term "diene," as used herein, refers to conjugated acyclic dienes, i.e., where the carbon-carbon double bonds are separated by a single carbon-carbon bond. In some embodiments, the diene possesses only carbon and hydrogen atoms, and optionally one or more halogen atoms. In other embodiments, the diene may include one or more functional groups that include oxygen and/or nitrogen atoms, such as those described in U.S. Pat. No. 6,583,260, which is herein incorporated by reference. Some examples of diene monomer units include, for example, butadiene (i.e., 1,3-butadiene), isoprene, chloroprene, 2-(cyanomethyl)-1,3-butadiene, and 2-(N,N-dimethylaminomethyl)-1,3-butadiene. Component (ii) is also referred to herein as the "acrylonitrile rubber component". The term "copolymer," as used herein, indicates the presence of at least two types of polymer units, wherein the at least two types of polymer units are typically present in random form or as blocks (i.e., segments), but in some cases may be engaged in alternating, periodic, branched, or graft form. In some embodiments, the acrylonitrile rubber component contains only acrylonitrile and diene units. In the case of the acrylonitrile rubber component containing only acrylonitrile and butadiene units, it may be more specifically referred to as a "nitrile butadiene rubber" or "NBR" component. In other embodiments, the acrylonitrile rubber component contains acrylonitrile and diene units along with one or more other units, such as one or more of styrene, divinyl benzene, acrylate and methacrylate units. For purposes of the invention, the presence of the one or more additional units should not result in a non-elastomeric (i.e., non-rubbery) material. In the case where styrene units are included, the component (ii) may be more specifically referred to as an "acrylonitrile butadiene styrene" or "ABS" component. The acrylonitrile rubber component generally possesses the known or expected physical attributes of nitrile butadiene rubber materials of the art, such as a substantial elasticity, as generally evidenced in a typical ultimate elongation of at least 50%, 100%, 150%, 200%, 250%, 300%, 350%, 400%, 450%, or 500%. In some embodiments, the acrylonitrile rubber component contains functionalizing groups aside from nitrile and unsaturated carbon-carbon bonds, such as carboxy, hydroxy, ester, amino, or epoxy groups. In other embodiments, one or all of such functionalizing groups are excluded from the acrylonitrile rubber component. In some embodiments, any functionalizing groups capable of reacting with the lignin component (e.g., phenol- or hydroxy-reactive groups, such as epoxy or aldehyde groups) to form covalent bonds therewith are not present in the acrylonitrile rubber component. In some embodiments, the acrylonitrile rubber component contains only acrylonitrile and isoprene units, in which case it may be more specifically referred to as a "nitrile isoprene rubber" or "NIR" component.

The acrylonitrile rubber component can also have any of a wide range of weight-average molecular weights ($M_w$), such as precisely, about, at least, above, up to, or less than, for example, 2,500 g/mol, 3,000 g/mol, 5,000 g/mol, 10,000 g/mol, 50,000 g/mol, 100,000 g/mol, 150,000 g/mol, 200,000 g/mol, 300,000 g/mol, 400,000 g/mol, 500,000 g/mol, or 1,000,000 g/mol, or a molecular weight within a range bounded by any two of the foregoing exemplary values. The acrylonitrile rubber component may also have any of a wide range of number-average molecular weights $M_n$, wherein n can correspond to any of the numbers provided above for $M_w$.

For purposes of the invention, the acrylonitrile rubber component has an acrylonitrile content of at least 20 mol %. In different embodiments, the acrylonitrile rubber component has an acrylonitrile content of about, at least, or above 20, 25, 30, 33, 35, 38, 40, 42, 45, 48, 50, 52, or 55 mol %, or an acrylonitrile content within a range bounded by any two of the foregoing values.

In the polymer blend material, the lignin component (i) is present in an amount of at least 5 wt % and up to about 95 wt % by total weight of components (i) and (ii). As both components (i) and (ii) are present in the polymer blend, each component must be in an amount less than 100 wt %. In different embodiments, the lignin component is present in the polymer blend material in an amount of about, at least, or above, for example, 5, 10, 15, 20, 25, 30, 35, 40, 45, 50, 55, 60, 65, 70, 75, 80, 90, or 95 wt %, or in an amount within a range bounded by any two of the foregoing exemplary values, e.g., at least or above 15, 20, 25, 30, 35, or 40 wt %, and up to 45, 50, 55, 60, 65, or 70 wt % by total weight of components (i) and (ii). In more particular embodiments, the lignin component is present in an amount of 20, 25, 30, 35, or 40 wt %, and up to 45, 50, 55, or 60 wt % by total weight of components (i) and (ii), or more particularly, at least 30, 35, or 40 wt %, and up to 45, 50, or 55 wt % by total weight of components (i) and (ii).

The polymer blend material described herein may or may not include a component other than the components (i) and (ii). For example, in some embodiments, an agent that favorably modifies the physical properties (e.g., tensile strength, modulus, and/or elongation) may be included. Some of these modifying agents include, for example, carbon particles, silicon-containing particles (e.g., silica or silicate particles), ether-containing polymers, Lewis acid compounds, solvents or plasticizers, and metal oxide compounds. In some embodiments, one or more such modifying agents are each independently, or in total, present in an amount of up to or less than 40, 30, 20, 15, 10, 5, 4, 3, 2, or 1 wt %, or are excluded from the polymer blend material.

The carbon particles, if present in the polymer blend material, can be any of the carbon particles known in the art that are composed at least partly or completely of elemental carbon, and may be conductive, semiconductive, or non-conductive. The carbon particles may be nanoparticles (e.g., at least 1, 2, 5, or 10 nm, and up to 20, 50, 100, 200, or 500 nm), microparticles (e.g., at least 1, 2, 5, or 10 μm, and up to 20, 50, 100, 200, or 500 μm), or macroparticles (e.g., above 500 μm, or at least or up to 1, 2, 5, 10, 20, 50, or 100 mm). Some examples of carbon particles include carbon black ("CB"), carbon onion ("CO"), a spherical fullerene (e.g., buckminsterfullerene, i.e., $C_{60}$, as well as any of the smaller or larger buckyballs, such as $C_{20}$ or $C_{70}$), a tubular fullerene (e.g., single-walled, double-walled, or multi-walled carbon nanotubes), carbon nanodiamonds, and carbon nanobuds, all of which have compositions and physical and electrical properties well-known in the art. As known in the art, fully graphitized carbon nanodiamonds can be considered to be carbon onions.

In some embodiments, the carbon particles are made exclusively of carbon, while in other embodiments, the carbon particles can include an amount of one or a combination of non-carbon non-hydrogen (i.e., hetero-dopant) elements, such as nitrogen, oxygen, sulfur, boron, silicon, phosphorus, or a metal, such as an alkali metal (e.g., lithium), alkaline earth metal, transition metal, main group metal (e.g., Al, Ga, or In), or rare earth metal. Some examples of binary carbon compositions include silicon carbide (SiC) and tungsten carbide (WC). The amount of hetero element can be a minor amount (e.g., up to 0.1, 0.5, 1, 2, or 5 wt % or mol %) or a more substantial amount (e.g., about, at least, or up to 10, 15, 20, 25, 30, 40, or 50 wt % or mol %). In some embodiments, any one or more of the specifically recited classes or specific types of carbon particles or any one or more of the specifically recited classes or specific types of hetero-dopant elements are excluded from the carbon particles.

In some embodiments, the carbon particles can be any of the high strength carbon fiber compositions known in the art. As known in the art, the carbon fiber has its length dimension longer than its width dimension. Some examples of carbon fiber compositions include those produced by the pyrolysis of polyacrylonitrile (PAN), viscose, rayon, pitch, lignin, polyolefins, as well as vapor grown carbon nanofibers, single-walled and multi-walled carbon nanotubes, any of which may or may not be heteroatom-doped, such as with nitrogen, boron, oxygen, sulfur, or phosphorus. The carbon particles may also be two-dimensional carbon materials, such as graphene, graphene oxide, or graphene nanoribbons, which may be derived from, for example, natural graphite, carbon fibers, carbon nanofibers, single walled carbon nanotubes and multi-walled carbon nanotubes. The carbon fiber typically possesses a high tensile strength, such as at least 500, 1000, 2000, 3000, 5000, 7,000, or 10,000 MPa, or higher, with a degree of stiffness generally of the order of steel or higher (e.g., 100-1000 GPa). In some embodiments, any one or more classes or specific types of the foregoing carbon particles are excluded from the polymer blend.

The ether-containing polymer, if present in the polymer blend material, can be, for example, a polyalkylene oxide (i.e., polyethylene glycol) or a copolymer thereof. Some examples of polyalkylene oxides include the polyethylene oxides, polypropylene oxides, polybutylene oxides, and copolymers thereof or with ethylene, propylene, or allyl glycidyl ether. The ether-containing polymer may also be, for example, a polyvinyl cyanoethyl ether, as described in, for example, U.S. Pat. No. 2,341,553, the contents of which are herein incorporated by reference. The ether-containing polymer may also be, for example, an etherified form of PVA, such as poly(vinyl methyl ether), which may correspond to CAS No. 9003-09-2. The ether-containing polymer may also be, for example, a phenyl ether polymer, which may be a polyphenyl ether (PPE) or polyphenylene oxide (PPO). The ether-containing polymer may also include cyclic ether groups, such as epoxide or glycidyl groups, or as further described in, for example, U.S. Pat. No. 4,260,702, the contents of which are herein incorporated by reference. The cyclic ether polymer may also be a cyclic anhydride modified polyvinyl acetal, as further described in U.S. Pat. No. 6,555,617, or a cyclic or spirocyclic polyacetal ether, as further described in, for example, A. G. Pemba, et al., *Polym. Chem.*, 5, 3214-3221 (2014), the contents of which are herein incorporated by reference. In yet other embodiments, the ether-containing polymer may be a cyclic or non-cyclic thioether-containing polymer, such as a polyphenyl thioether or polyphenylene sulfide. In some embodiments, any one or more classes or specific types of the foregoing ether-containing polymers are excluded from the polymer blend.

The Lewis acid compounds, if present in the polymer blend material, can be any of the compounds known in the art having Lewis acid character, i.e., strongly electrophilic by virtue of a deficiency of electrons. Some examples of Lewis acid compounds include boron-containing compounds (e.g., boric acid, borates, borate esters, boranes, and boron halides, such as $BF_3$, $BCl_3$, and $BBr_3$), aluminum-containing compounds (e.g., aluminum hydroxide, aluminates, aluminate esters, and aluminum halides, such as $AlF_3$, $AlCl_3$, and $AlBr_3$), and tin-containing compounds (e.g., stannic acid, tin esters (e.g., tin(II) acetate or tin(II) 2-ethylhexanoate), tin alkoxides (e.g., tin(IV) ethoxide), and tin halides, such as $SnF_4$, $SnCl_4$, $SnBr_4$, and $SnI_4$,). In some embodiments, any one or more classes or specific types of the foregoing Lewis acid compounds are excluded from the polymer blend.

The metal oxide compounds, if present in the polymer blend material, can be any metal oxide composition, typically particulate in form, that can function to improve a physical characteristic of the polymer blend material. The metal of the metal oxide composition can be, for example, an alkali metal, alkaline earth metal, main group metal, transition metal, or lanthanide metal. Some examples of alkali metal oxides include $Li_2O$, $Na_2O$, $K_2O$, and $Rb_2O$. Some examples of alkaline earth metal oxide compositions include BeO, MgO, CaO, and SrO. Some examples of main group metal oxide compositions include $B_2O_3$, $Ga_2O_3$, SnO, $SnO_2$, PbO, $PbO_2$, $Sb_2O_3$, $Sb_2O_5$, and $Bi_2O_3$. Some examples of transition metal oxide compositions include $Sc_2O_3$, $TiO_2$, $Cr_2O_3$, $Fe_2O_3$, $Fe_3O_4$, FeO, $Co_2O_3$, $Ni_2O_3$, CuO, $Cu_2O$, ZnO, $Y_2O_3$, $ZrO_2$, $NbO_2$, $Nb_2O_5$, $RuO_2$, PdO, $Ag_2O$, CdO, $HfO_2$, $Ta_2O_5$, $WO_2$, and $PtO_2$. Some examples of lanthanide metal oxide composition include $La_2O_3$, $Ce_2O_3$, and $CeO_2$. In some embodiments, any one or more classes or specific types of the foregoing metal oxides are excluded from the polymer blend.

A halogen-containing polymer, which may also function as a modifying agent, may or may not be present in the polymer blend material. The halogen-containing polymer, if present in the polymer blend material, can have the halogen atoms bound to aliphatic (i.e., non-aromatic, e.g., alkyl or alkenyl) or aromatic groups, as described above for a hydroxy-containing polymer. The halogen atoms can be, for example, fluorine, chlorine, and bromine atoms. Some examples of fluorinated polymers include poly(vinyl fluoride), poly(vinylidene fluoride), poly(tetrafluoroethylene), fluorinated ethylene-propylene copolymer, poly(ethylenetetrafluoroethylene), poly(perfluorosulfonic acid), and fluoroelastomers. Some examples of chlorinated polymers include poly(vinyl chloride), polyvinylidene chloride, ethylene-chlorotrifluoroethylene copolymer, polychloroprene, halogenated butyl rubbers, chlorinated polyethylene, chlorosulfonated polyethylene, chlorinated polypropylene, chlorinated ethylene-propylene copolymer, and chlorinated polyvinyl chloride. Some examples of brominated polymers include poly(vinyl bromide), and brominated flame retardants known in the art, such as brominated epoxy, poly(brominated acrylate), brominated polycarbonate, and brominated polyols.

The polymer blend material preferably possesses a tensile yield stress (or "yield stress" or "tensile yield strength") of at least or above 5 MPa. In different embodiments, the tensile yield stress is at least or above 5 MPa, 8 MPa, 10 MPa, 12 MPa, 15 MPa, 20 MPa, 25 MPa, 30 MPa, 40 MPa, 50 MPa, 60 MPa, 70 MPa, 80 MPa, 90 MPa, or 100 MPa, or a yield stress within a range bounded by any two of the foregoing exemplary values. As understood in the art, the term "tensile yield strength" or "yield stress" refers to the stress maxima in the stress-strain curve experienced by the polymer during tensile deformation just after the linear elastic region; polymers deformed beyond the yield stress usually show permanent deformation. Beyond the "tensile yield stress" point in the stress-strain profile of the polymer, the stress experienced by the polymer during stretching may remain less than that of the yield stress. Thus, "tensile strength" that is defined at the stress experienced by polymer at fracture or failure point can be lower than the yield strength. In some polymers, the tensile stress experienced at failure is significantly higher than that of the yield stress. In such cases, the stress-strain curve shows a rise (sometimes steep rise) in stress with increase in strain due to enhanced molecular orientation along the direction of deformation. Such a phenomenon of increase in the stress at large strain values (as the polymer molecules orient) is known as "strain hardening".

For some of the exemplary yield stress values provided above, the tensile strength (i.e., the tensile stress experienced at failure) of the polymer blend will be higher according to the known difference in how yield stress and tensile strength are defined. Accordingly, the polymer blend material should possess a tensile strength of above 5 MPa. In different embodiments, the polymer blend material may exhibit a tensile strength of at least or above, for example, 6 MPa, 8 MPa, 10 MPa, 12 MPa, 15 MPa, 20 MPa, 25 MPa, 30 MPa, 35 MPa, 40 MPa, 45 MPa, 50 MPa, 60 MPa, 70 MPa, 80 MPa, 90 MPa, 100 MPa, 200 MPa, 300 MPa, 400 MPa, 500

MPa, 600 MPa, 700 MPa, 800 MPa, 900 MPa, or 1000 MPa, or a tensile strength within a range bounded by any two of the foregoing exemplary values. In some embodiments, the polymer composition does not show strain hardening; it fails at a stress below the yield stress while stretching. Any of the above tensile yield strengths can be exhibited while at an elongation or strain of at least or above 0.1%, 0.2%, 0.5%, 1, 10%, 20%, or 50%. The strain corresponding to the yield stress is called "yield strain". In other embodiments, the polymer blend material does not show a prominent yield stress.

The polymer blend material preferably possesses an ultimate elongation of at least or above the yield strain. In some embodiments, the polymer blend material preferably possesses an ultimate elongation of at least or above 50%. In different embodiments, the polymer blend material may exhibit an ultimate elongation of at least or above 100%, 110%, 120%, 150%, 180%, 200%, 250%, 300%, 350%, 400%, 450%, or 500%, or an ultimate elongation within a range bounded by any two of the foregoing exemplary values. In some embodiments, the polymer blend material possesses any of the above preferable elongation characteristics along with any of the preferable yield stress or tensile strength characteristics, also provided above. In some embodiments, the polymer blend material exhibits less than 50% ultimate elongation.

In some embodiments, the polymer blend material exhibits a tensile stress of at least or above 5 MPa at 1% elongation. In other embodiments, the polymer blend material exhibits a tensile stress of at least or above 5 MPa at 10% elongation. In other embodiments, the tensile stress at 10% elongation is at least or above 10 MPa. In specific embodiments, the tensile stress at 50% elongation is at least or above 5 MPa, 10 MPa, 15 MPa, 20 MPa, 30 MPa, 40 MPa, or 50 MPa. In some embodiments, the tensile stress at 100% elongation is at least or above 5 MPa, 10 MPa, 15 MPa, 20 MPa, 30 MPa, or 50 MPa. A conventional cross-linked (also known as vulcanized) NBR matrix containing 50 parts per hundred resin lignin may exhibit a tensile strength of only 1.5 MPa, a tensile stress at 100% elongation of 1.3 MPa, and 250% ultimate elongation, and likely no yield stress (Setua D K, et al., POLYMER COMPOSITES, Vol. 21, No. 6, 988-995, 2000). Compared to these results, compositions shown in the instant disclosure show dramatically improved mechanical properties.

In particular embodiments, the polymer blend material possesses a yield stress of at least or above 10 MPa, 15 MPa, 20 MPa, 25 MPa, 30 MPa, 40 MPa, or 50 MPa along with an ultimate elongation of at least or above 50%, 100%, 150%, 180%, 200%, 250%, or 300%. Moreover, in some embodiments, the polymer blend material exhibits strain hardening during mechanical deformation, such as during stretching beyond yield strain to ultimate failure.

In another aspect, the instant disclosure is directed to methods for producing the polymer blend material described above. In the method, at least (or only) the components (i) and (ii) are mixed and homogeneously blended to form the polymer blend material. Any one of the components can be included in liquid form (if applicable), in solution form, or in particulate or granular form. In the case of particles, the particles may be, independently, nanoparticles (e.g., at least 1, 2, 5, or 10 nm, and up to 20, 50, 100, 200, or 500 nm), microparticles (e.g., at least 1, 2, 5, or 10 µm, and up to 20, 50, 100, 200, or 500 µm), or macroparticles (e.g., above 500 or at least or up to 1, 2, 5, 25, 50, 100, 500, or 1000 mm). Typically, if any polymeric component is provided in particle or granular form, the particles are melted or softened by appropriate heating to permit homogeneous blending and uniform dispersion of the components. The components can be homogeneously blended by any of the methodologies known in the art for achieving homogeneous blends of solid, semi-solid, gel, paste, or liquid mixtures. Some examples of applicable blending processes include simple or high speed mixing, compounding, extrusion, or ball mixing, all of which are well-known in the art. In some embodiments, the acrylonitrile containing rubbers are in solid bale form and those could be cut in to useable chunks using standard bale cutting tools. Those chunks of different sizes are mixed or blended with other component(s) in an internal mixer (such as Banbury mixer). In other embodiments, the acrylonitrile containing rubbers are in latex form and those are mixed or blended with component(s) in a ball mill. In some other embodiments, the acrylonitrile containing rubbers are in sheet form and the components are mixed in a two-roll mill.

By being "homogeneously blended" is meant that, in macro (e.g., millimeter) scale, no discernible regions of at least components (i) and (ii) exist. If a modifying agent, as discussed above, is included, all or a portion of the modifying agent may or may not remain in the solid (unmelted) phase, e.g., either in elemental state (e.g., carbon particles) or in crystalline lamella phase (e.g., polyethylene oxide). In other words, the homogeneous blend may possess a modified or compatibilized phase structure (not necessarily a single phase structure, but often with retained but shifted $T_g$ associated with individual phases) for at least components (i) and (ii). The modified-phase structure generally indicates near homogeneous integration at microscale or near the molecular level without losing each component's identity. In the case of an additional non-homogeneous component, the instantly described polymer blend including components (i) and (ii) can be viewed as a "homogeneous matrix" in which the additional non-homogeneous component is incorporated. Preferably, all of the components retain their identity and components are well dispersed in the nanometer scale.

In some embodiments, the mixture being blended further includes a crosslinking (or curing) agent, which may be a radical or physical crosslinking agent. A particular example of a physical crosslinking or curing agent is sulfur. The radical crosslinking agent is any substance that produces radicals to effect crosslinking of component (i) and/or (ii) either during the blending process and/or subsequently during a conditioning process, activation process, curing process, and/or shape-forming process. The radical crosslinking agent may decompose under thermal or radiative exposure to form reactive radicals. The radical crosslinking agent may be, for example, any of the radical polymerization initiators known in the art. In particular embodiments, the radical crosslinking agent is an organic peroxide compound. Some examples of organic peroxide compounds include dicumyl peroxide (DCP), t-butyl peroxide, benzoyl peroxide, methyl ethyl ketone peroxide, and acetone peroxide. The radical crosslinking agent may alternatively be an inorganic peroxide compound, such as a peroxydisulfate salt. The radical crosslinking agent may or may not also be selected from non-peroxide radical-producing compounds, such as azo compounds (e.g., AIBN or ABCN), or a halogen (e.g., $Br_2$ or $I_2$). In some embodiments, radical crosslinking may be achieved by physical means, such as by exposure of the material to electron beam (e.g., Stelescu et al., *The Scientific World Journal*, 684047, 2014) or ultraviolet (UV) radiation (e.g., Naskar et al., *Carbon*, 43(5) 1065-1072, 2005) that generates free radicals for crosslinking of the components. Hydrocarbon polymers generate free radicals by exposure to electron beam radiation. In some embodiments, to facilitate UV crosslinking, the polymer blend may be further modified with acrylates and/or conjugated ketones (benzophenone derivatives) additives that generate free radicals when exposed to UV radiation. In other embodiments, any one or more specific types or general class of crosslinking or curing agents are excluded from the preparation process.

The process for preparing the polymer blend material can employ any of the weight percentages (i.e., wt %) of components provided in the earlier description of the polymer blend material. Moreover, during the process (i.e., during blending), certain ranges in processing temperature (i.e., during blending), shear rate, and processing time (i.e., duration of blending at a particular temperature) have been found to be particularly advantageous in producing a polymer blend material having particularly desirable physical characteristics. With respect to processing temperature, the blending process is preferably conducted at a temperature of at least or above 100° C. and up to or less than 200° C., which may be a temperature of about, for example, 100° C., 110° C., 120° C., 130° C., 140° C., 150° C., 160° C., 170° C., 180° C., 190° C., or 200° C., or a temperature within a range bounded by any two of the foregoing values. With respect to the shear rate (which is related to the mixing speed in rpm), the blending process is preferably conducted at a shear rate of at least or above 10 s$^{-1}$ and up to or less than 1000 s$^{-1}$, which may be a shear rate of about, for example, 10, 20, 30, 40, 50, 100, 150, 200, 250, 300, 350, 400, 500, 600, 700, 800, 900, or 1000 s$^{-1}$, or a shear rate within a range bounded by any two of the foregoing values. The mixing rate (in rpm) corresponding to the foregoing shear rate range is approximately 1-150 revolutions of the blades per minute. With respect to processing time, the blending process preferably employs a processing time (time during blending at a particular temperature and shear rate) of at least or above 5 minutes and up to or less than 45 minutes, which may be a processing time of about, for example, 10, 15, 20, 25, 30, 35, 40, or 45 minutes, or a time within a range bounded by any two of the foregoing values.

The polymer blend material is typically subjected to a shape-forming process to produce a desired shape of the polymer blend. The shape-forming process can include, for example, extrusion molding (e.g., pour, injection, or compression molding), melt pressing, or stamping, all of which are well known in the art. In other embodiments, the polymer blend material is used in a printing process to form a shape containing the polymer blend material, wherein the printing process can be, for example, a rapid prototyping (RP) process known in the art, such as a fused deposition modeling (FDM) or fused filament fabrication (FFF) process known in the art, which may also be collectively considered as 3D printing processes.

In still other aspects, the invention is directed to an article containing the polymer blend described above. The article is typically one in which some degree of toughness is desired along with high mechanical strength. The blend may or may not be further reinforced with, for example, continuous carbon, ceramic, or metallic fibers to produce composite parts. The article may be used as or included in any useful component, such as a structural support, the interior or exterior of an automobile, furniture, a tool or utensil, or a high strength sheet or plate. In some embodiments, the polymer blend may be produced and applied as a coating or film, such as a protective film. The polymer blend may be rendered as a coating or film by, for example, melting the blend or dissolving the components of the blend in a suitable solvent, followed by application of the liquid onto a suitable substrate and then solvent removal.

Examples have been set forth below for the purpose of illustration and to describe certain specific embodiments of the invention. However, the scope of this invention is not to be in any way limited by the examples set forth herein.

Example 1

Effect of the Type of Rubber

Experimental

Three different types of general purpose rubber, including nitrile butadiene (NBR), styrene butadiene (SBR), and butadiene (BR), were studied for melt-phase reaction with a softwood Kraft-processed lignin (SW-A) in a Brabender internal mixer. All blends contained 12.5 g rubber, 12.5 g SWA, and 0.5 g dicumyl peroxide (DCP). The mixing was conducted at 160° C. and 90 rpm. First, the mixer was preheated at 160° C. (set point), and the rotor speed was maintained at 90 rpm. Then rubber was added to the chamber and masticated for 1 minute. Subsequently, SW-A was added, mixed, and reacted with rubber for 20 minutes. Finally, the composition was cooled down below 120° C. and then dicumyl peroxide (DCP) was added. The blend was mixed at 10 rpm for 5 minutes. At the end of the mixing, samples were recovered and stored at room temperature. A 21 g sample of the material was compressed in a hydraulic presser at 165° C. for 20 minutes at 5 metric tons of pressure. Dumbbell-shaped specimens were punched out of compression molded sheets and used for tensile testing.

Results

FIG. 1 shows the torque profile experienced by the blend compositions described above during melt-mixing as a function of time. All blends initially show two torque maxima, which are due to the introduction of cold rubber and lignin into the mixer. Once the materials reach the set temperature and get melted, the torque begins to level down. After a certain time, there is a substantial increase in the torque for the blends of NBR and BR with SW-A. The unexpected increase in torque may indicate a reaction or a physical interaction occurring between lignin and rubbers, and such interaction or reaction would result in the formation of a network that increases viscosity of the melt. As a possible explanation, the results could indicate that free radicals are generated due to friction from mixing at high rotation speed and temperature. The free radicals may then facilitate a grafting reaction between the lignin and rubber. In the case of SBR, the reaction can be highly reversible, and no change in the torque is observed. Alternatively, prolonged mixing with lignin might have allowed preferential exfoliation of lignin molecules due to favorable solubility or interaction in NBR matrix compared to SBR or BR.

Figure 2A:
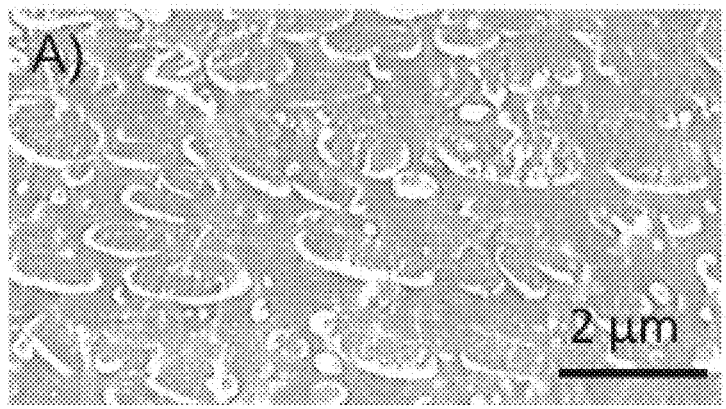
FIGS. 2A-2C. Scanning electron microscope (SEM) micrographs of the three different blends, as shown in FIG. 1, containing SW-A dispersed in either nitrile butadiene rubber (NBR) (FIG. 2A), styrene butadiene rubber (SBR) (FIG. 2B), and butadiene rubber (BR) (FIG. 2C).
Figure 2B:
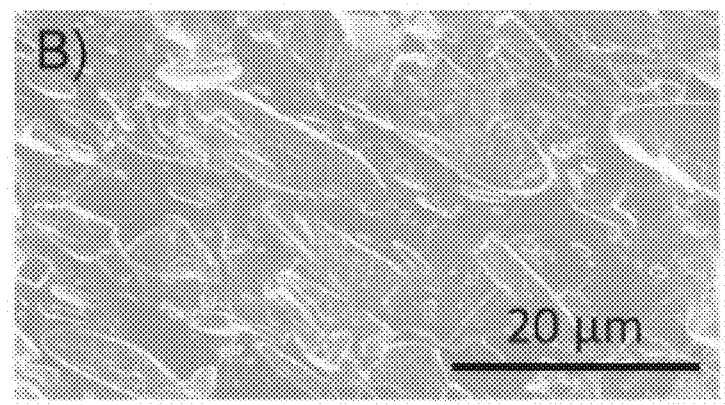
Figure 2C:
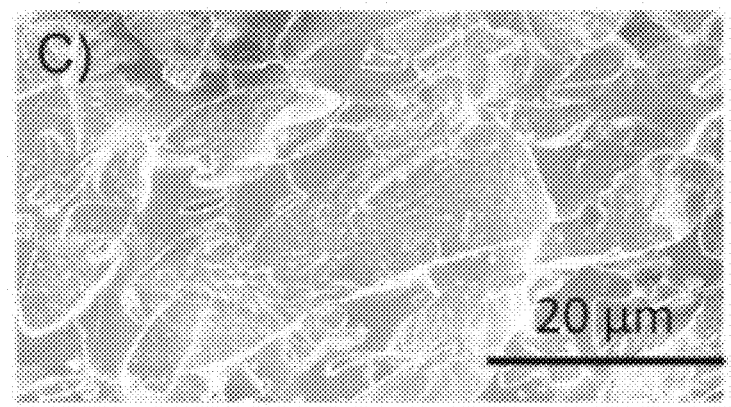

FIGS. 2A-2C are scanning electron microscope (SEM) micrographs of the three different blends, as described above, containing SW-A dispersed in either nitrile butadiene rubber (NBR) (FIG. 2A), styrene butadiene rubber (SBR) (FIG. 2B), and butadiene rubber (BR) (FIG. 2C). The cryo-fractured surfaces are observable in each of the SEM micrographs. Surprisingly, as shown, SW-A is well dispersed in NBR (as matrix) with a domain size of less than 2 µm, while SW-A has a domain size of more than 10 µm in SBR (as matrix). The foregoing unexpected result may be explained as a result of a reaction or physical interaction occurring during mixing between NBR and SW-A. Although an interaction appears to be occurring between BR and SWA, the domain size of SW-A is much larger in the BR matrix. A network appears to be formed between SW-A and BR; however, phase incompatibility likely leads to coalescence of dispersed lignin phases and formation of a larger domain size compared to mixtures using other rubbers, particularly NBR.

Figure 3:
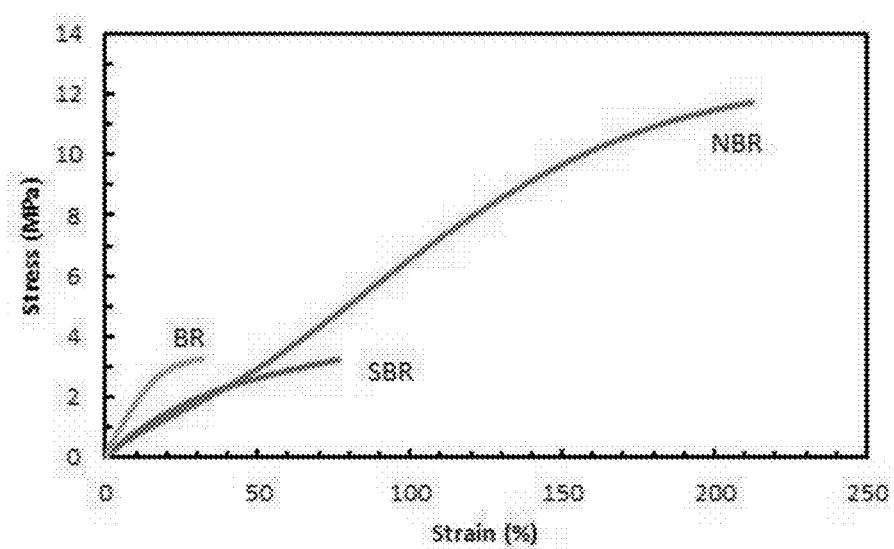
FIG. 3. Stress-strain curves of the three different blends, as shown in FIG. 1, containing SW-A dispersed in either nitrile butadiene rubber (NBR) (bottom curve), styrene butadiene rubber (SBR) (middle curve), and butadiene rubber (BR) (top curve).

Further unexpected results were observed in the physical characteristics of the lignin-rubber blends described above. In particular, as shown in the stress-strain curve provided in FIG. 3, the tensile strength of the blend of SWA with NBR was highest and outperformed the other two blends using SBR or BR. Apparently, the increased compatibility of the lignin component with NBR and resulting smaller lignin domain sizes are at least in part responsible for the improved stress-strain characteristics.

Example 2

Effect of Processing Conditions

Experimental

In the previous example, blends containing nitrile rubber (NBR) outperformed blends containing other rubbers (SBR and BR). As a result, blends containing nitrile rubber blended with SW-A were further studied by varying different aspects of the processing conditions. The following experiments studied the effect of mixing temperature, rotation speed, and the processing time. The same blend composition was used: 12.5 g NBR, 12.5 g SW-A, and 0.5 g DCP, and four different mixing conditions of NBR and SW-A were studied, as follows. The first sample was mixed at 80° C., 60 rpm, and for 30 minutes. The second sample was mixed at 160° C., 60 rpm, and for 20 minutes to compare the effect of mixing temperature with the first sample. The third sample was mixed at 160° C., 90 rpm, and for 20 minutes to compare the effect of shear rate or mixing speed with the second sample. The last sample was mixed at 160° C., 90 rpm, and for 30 minutes to compare the effect of mixing time with the third sample. After mixing of NBR and SW-A, all blends were cooled down to 120° C. and mixed with DCP for 5 minutes at 10 rpm. At the end of the mixing, samples were recovered and stored at room temperature. About 21 g of sample material was compression molded at 165° C. for 20 minutes at 5 metric tons of pressure. Dumbbell-shaped specimens were punched out of compression molded sheets and used for tensile testing.

Results

Figure 4:
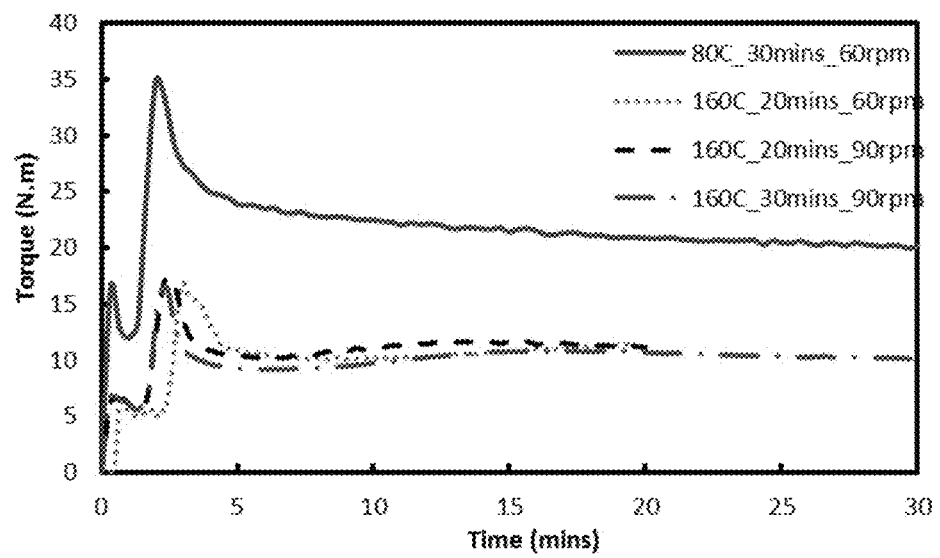
FIG. 4. Graph plotting torque vs. time during mixing for four different samples of blends containing nitrile butadiene rubber (NBR) and softwood lignin (SW-A), prepared by mixing equal parts by weight of the lignin and rubber, and processed under varying conditions of temperature, shear rate (mixing speed), and processing time.
Figure 5:
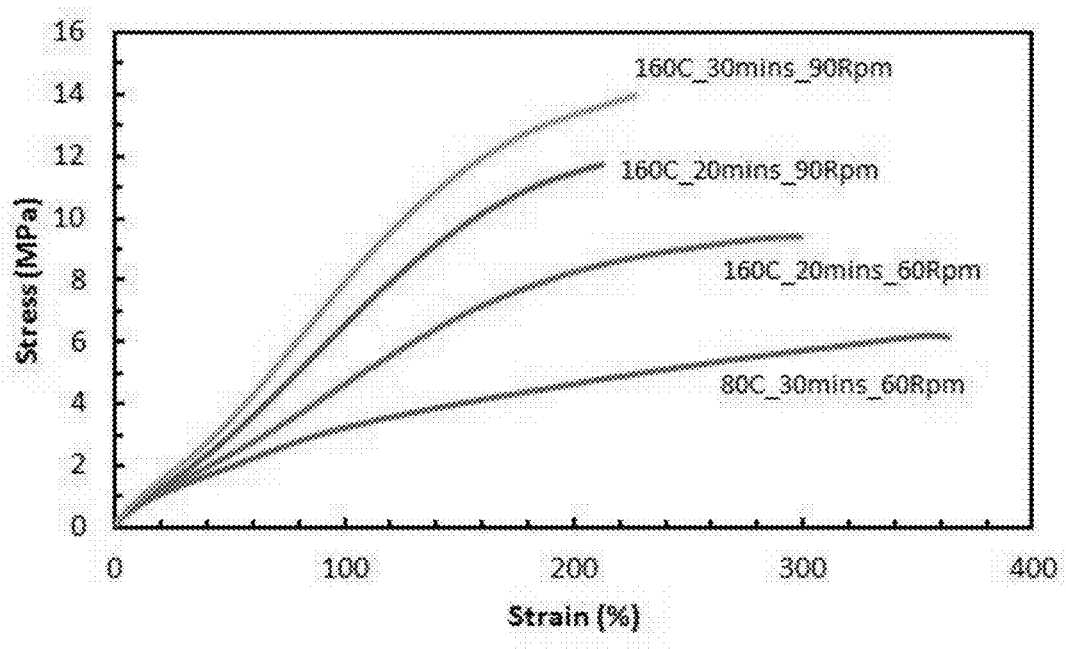
FIG. 5. Stress-strain curves of the four different samples of blends described in FIG. 4, prepared by mixing equal parts by weight of SW-A lignin and NBR, and processed under varying conditions of temperature, shear rate (mixing speed), and processing time.

As shown in the torque vs. time plot shown in FIG. 4, there was no substantial increase in torque when mixing was performed at the lower temperature of 80° C. The torque was leveled off and reached a steady state after introduction of NBR and SW-A in the mixing chamber. The foregoing result indicates that no significant interaction or reaction occurred when mixing was done at 80° C. Mixing at a higher temperature of 160° C. resulted in a slight increase in torque after a certain period of time. With respect to the effect of shear rate or mixing speed, an increase in torque was observed earlier at higher shear rate or mixing speed. At least 30 minutes was required to level off the degree of interaction or reaction between NBR and SW-A at 160° C. and 90 rpm mixing condition. The resulting stress-strain behavior of the above four blends is shown in FIG. 5. As shown, the optimum tensile strength is obtained for the NBR-SW-A blend processed at 160° C. and 90 rpm mixing condition for 30 minutes.

Example 3

Effect of SW-A Contents in NBR Blends

Experimental

The optimum processing conditions in the previous example (i.e., 160° C. and 90 rpm for 30 minutes) were selected for studying the effect of lignin content in the NBR-lignin blend. Five different compositions with varied lignin content ranging from 30 wt. % to 70 wt. % were studied. Each sample included a total of 25 g attributed to the NBR and SW-A lignin components, with different amounts of NBR and SW-A lignin. The DCP content was kept constant (0.5 g) for all mixtures. After mixing of NBR and SW-A, at 160° C., all blends were cooled down to 120° C. and mixed with DCP for 5 minutes at 10 rpm. At the end of the mixing, samples were recovered and stored at room temperature. About 21 g of sample material was compression molded at 165° C. for 20 minutes at 5 metric tons of pressure. Dumbbell-shaped specimens were punched out of compression molded sheets and used for tensile testing.

Figure 6:
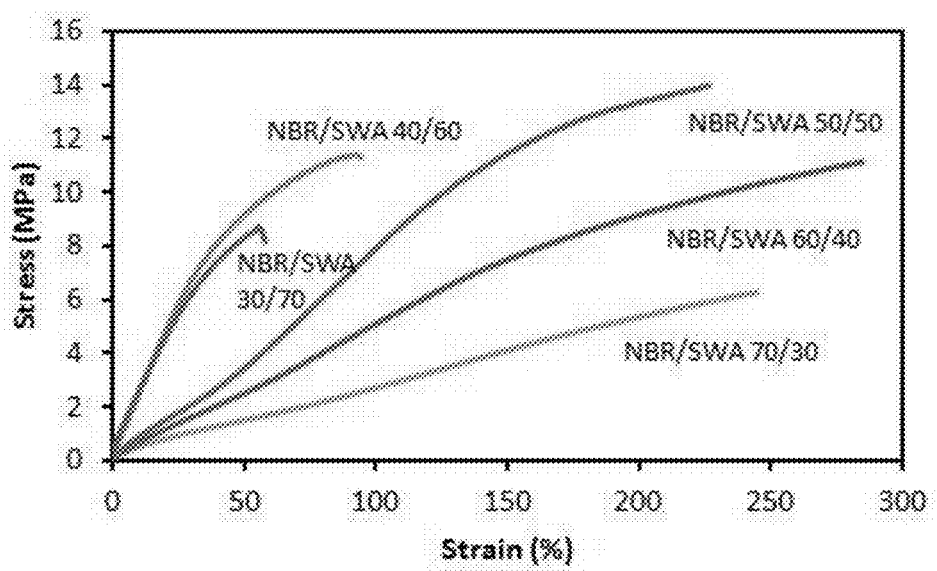
FIG. 6. Stress-strain curves of five different blend compositions containing NBR and SW-A lignin with lignin content varying from 30 wt % to 40 wt % to 50 wt % to 60 wt % to 70 wt %.

FIG. 6 shows stress-strain curves of five different blend compositions containing NBR and SW-A lignin with lignin content varying from 30 wt % to 40 wt % to 50 wt % to 60 wt % to 70 wt %, from bottom curve to top curve, respectively. As shown in FIG. 6, increasing the lignin content from 30 wt. % to 50 wt. % increased the tensile strength, while further increasing the lignin content reduced the performance. The mixture with 50% lignin content exhibited the highest tensile strength while maintaining a high elongation at break. Thus, the composition containing 50% SW-A and 50% NBR exhibited particularly desirable physical characteristics.

Figure 7A:
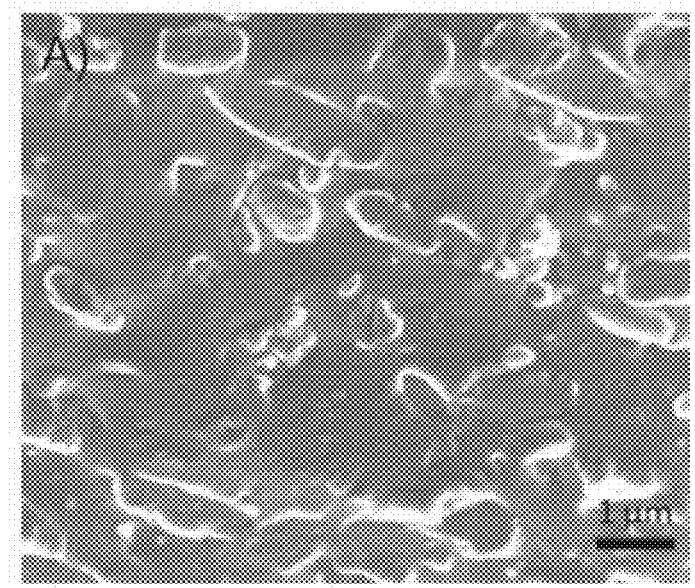
FIGS. 7A-7C. Scanning electron microscope (SEM) micrographs of cryogenically fractured surfaces of three selected NBR-lignin blend compositions, as described in FIG. 6, varying in SW-A lignin content, from 30 wt % lignin (FIG. 7A), 50 wt % lignin (FIG. 7B), and 70 wt % lignin (FIG. 7C).

SEM micrographs of three of the NBR-lignin blend compositions described above are shown in FIGS. 7A-7C, with SW-A lignin content varying from 30 wt % lignin (FIG. 7A), 50 wt % lignin (FIG. 7B), and 70 wt % lignin (FIG. 7C). As evidenced by the SEM micrographs in FIGS. 7A-7C, increasing the lignin content above 50% resulted in an increase in lignin domain size. The foregoing result makes apparent that the improvement in physical characteristics observed in blends containing lignin contents of up to 50 wt % can be attributed, at least in part, to the smaller lignin domain size, as compared to blends containing lignin contents significantly above 50%.

Example 4

Effect of Different Lignin Types Dispersed in NBR Matrix (33% Acrylonitrile Content)

Experimental

In this experiment, four different sources of lignin were studied, two from softwood (Kraft processed SW-A and SW-B; where compared to SW-A, SW-B is a lower $T_g$ (110° C. vs. 145° C. for the former), easier to melt-process lignin with low inorganic residue content) and two from hardwood (HW-A and HW-B; where HW-A is an alkali pulped lignin and HW-B is an organic solvent extracted hardwood lignin that has lower $T_g$ (98° C. vs. 127° C. for HW-A), lower inorganic content, and easier melt-processability), each in combination with NBR having a 33% acrylonitrile content. The primary purpose of the experiment was to determine if the natural differences in chemistry and/or processability between softwood and hardwood lignin, when blended with NBR, could have an impact on the reinforcing ability of the blend. The mixture composition was kept the same: 12.5 g NBR, 12.5 g lignin, and 0.5 g DCP, and the mixing conditions were based on those earlier found to be optimal, i.e., 160° C., 90 rpm, and for 30 minutes. At the end of the mixing, samples were recovered and stored at room temperature. About 21 g of sample material was compression molded in a press at 165° C. for 20 minutes at 5 metric tons pressure. Dumbbell-shaped specimens were punched out of compression molded sheets and used for tensile testing.

Results

Figure 8:
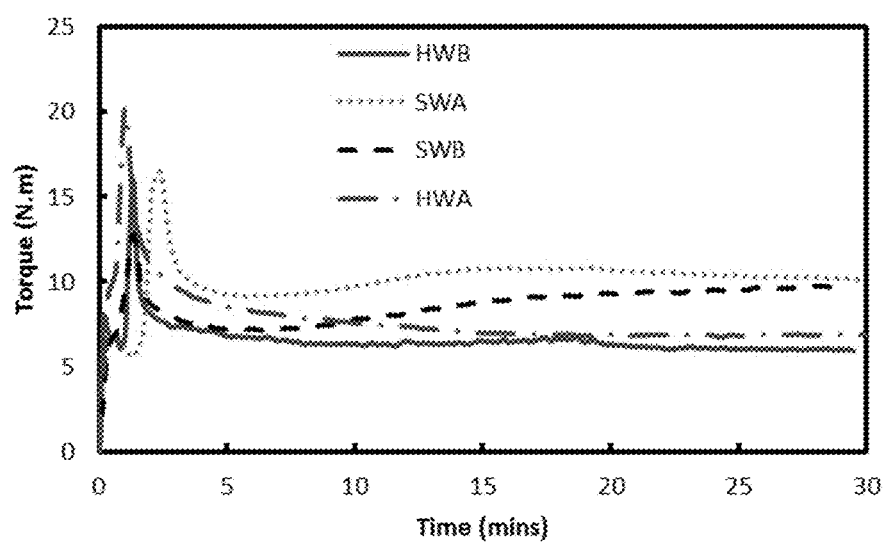
FIG. 8. Graph plotting torque vs. time during mixing for four different blends containing four different lignins (SW-A, SW-B, HW-A, and HW-B) in combination with NBR having 33% acrylonitrile content. The two lower curves are for HW lignins, and the two upper curves are for SW lignins.
Figure 9:
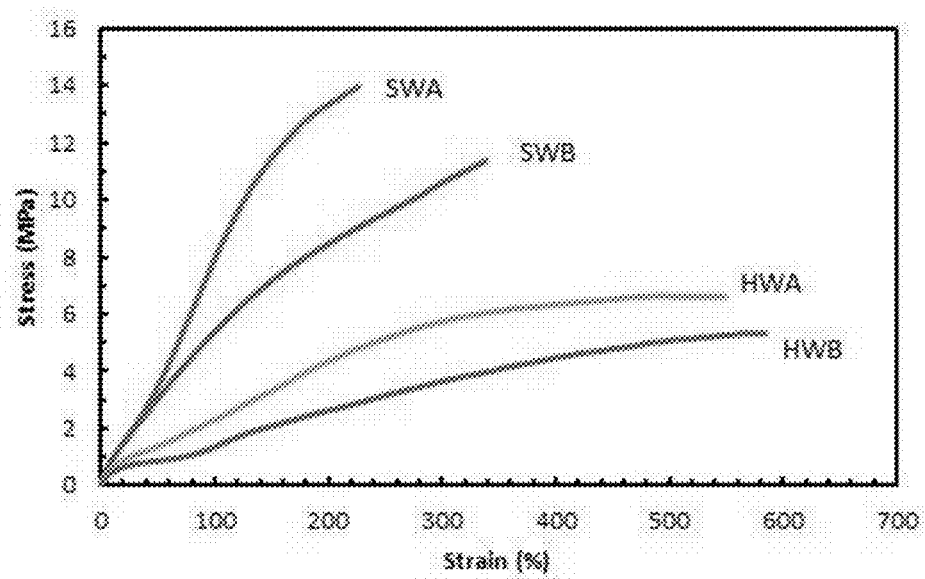
FIG. 9. Stress-strain curves of the four different blend compositions shown in FIG. 8 containing NBR having 33% acrylonitrile content and four different lignins (SW-A, SW-B, HW-A, and HW-B). The two lower curves are for HW lignins, and the two upper curves are for SW lignins.

FIG. 8 shows the evolution of torque during mixing of the four different lignins (SW-A, SW-B, HW-A, and HW-B) with NBR. Surprisingly, both softwood sources SW-A and SW-B showed an increase in torque after 10 minutes of mixing, which indicates an appreciable interaction or reaction, while both hardwood sources HW-A and HW-B did not show an increase in torque, which indicates a substantial lack of reactivity or physical interaction. FIG. 9 shows the resulting stress-strain characteristics of the four blends. As shown in FIG. 9, the tensile strength is higher for the NBR blend containing softwood lignin than the blend containing hardwood lignin.

Example 5

Producing Thermoplastics and Thermoplastic Elastomers by Blending Lignin with NBR Having a Higher Acrylonitrile Content of 41%

Experimental

NBR (41% acrylonitrile content) was blended with lignins from different sources. The experimental conditions were similar to Example 4 (i.e., equal weight percentages of lignin and NBR), except that NBR with 33% acrylonitrile content was replaced with NBR having 41% acrylonitrile content. Also, in order to promote formation of thermoplastics and thermoplastic elastomers, DCP was not used in these mixtures. The addition of DCP results in crosslinking reactions that hinder thermoplastic behavior and material processing, such as extrusion, molding, and recycling. At the end of the mixing, samples were recovered and stored at room temperature. About 21 g of sample material was compressed in a hydraulic presser at 180° C. for 8 minutes at 10 metric tons of pressure. Dumbbell-shaped specimens were punched out of compression molded sheets and used for tensile testing.

Results

Figure 10:
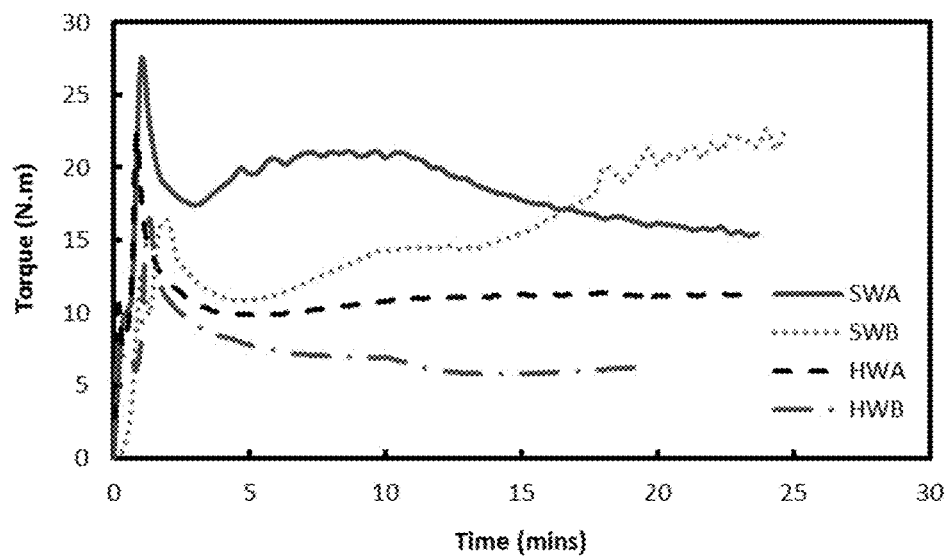
FIG. 10. Graph plotting torque vs. time during mixing for four different blends containing four different lignins (SW-A, SW-B, HW-A, and HW-B) in combination with NBR having 41% acrylonitrile content with lignin content at 50 wt %. The two lower curves are for HW lignins, and the two upper curves are for SW lignins.

FIG. 10 shows the evolution of torque during mixing for the four different blends described above containing four different lignins (SW-A, SW-B, HW-A, and HW-B) in combination with NBR having 41% acrylonitrile content. The two lower curves are for HW, and the two upper curves are for SW. As shown in FIG. 10, the torque evolution during mixing of lignin with NBR (41% acrylonitrile content) behaves in a manner similar to the case of NBR with 33% acrylonitrile content. However, a substantial difference in behavior is found in the case of mixing softwood lignin SW-B with NBR (41% acrylonitrile content). In view of these results, the torque profile indicates that there are two step reactions or interactions occurring during mixing.

Figure 11:
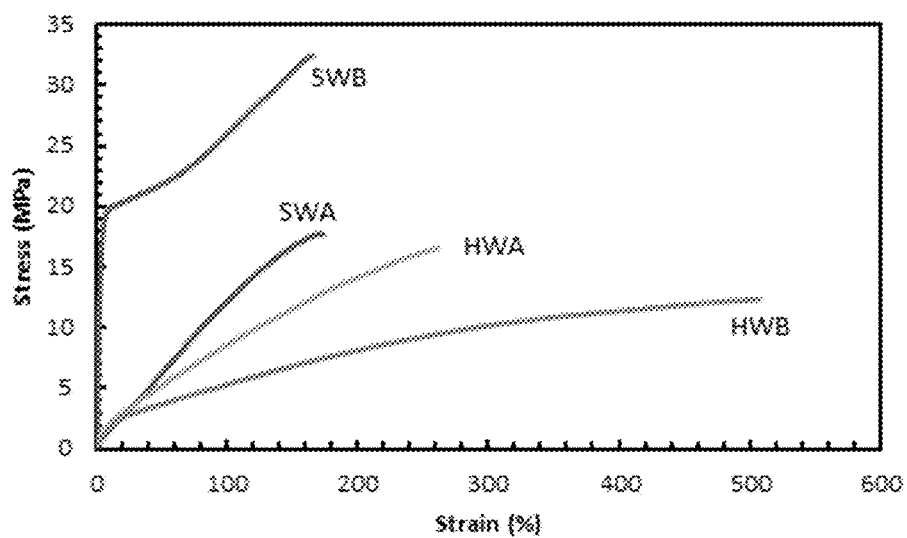
FIG. 11. Stress-strain curves of the four different blend compositions shown in FIG. 10 containing NBR having 41% acrylonitrile content blended with four different lignins (SW-A, SW-B, HW-A, and HW-B). The two lower curves are for HW lignins, and the two upper curves are for SW lignins.

FIG. 11 shows stress-strain curves of the four different blend compositions described above containing NBR having 41% acrylonitrile content blended with four different lignins (SW-A, SW-B, HW-A, and HW-B). The two lower curves are for HW, and the two upper curves are for SW. As particularly and unexpectedly shown in FIG. 11, the stress-strain behavior of the blends containing softwood lignin, and in particular, SW-B, indicates a material that can be considered to have more plastic behavior than elastomeric behavior. Notably, the material exhibits a very high initial slope upon increase in strain; beyond the yield point, the stress begins to increase at a slower rate, but is followed by a strain hardening when the strain is further increased. The foregoing behavior makes apparent that the second reaction (or interaction) in the blend of NBR with SW-B is likely the main contribution to the unique behavior in the stress-strain curve as compared to the other blends. The blend of NBR with SW-B shows a tensile strength of 32 MPa and an elongation at break of 160%. Surprisingly, the noted properties in tensile strength and elongation at break for the blend containing NBR and SW-B are in some respects superior over the known properties of the highly used commercial thermoplastic acrylonitrile styrene butadiene (ABS). Indeed, the blend containing NBR (41% ACN) and SW-B appears to exhibit stress-strain characteristics superior to currently known materials utilizing lignin as a reinforcing material.

Figure 12A:
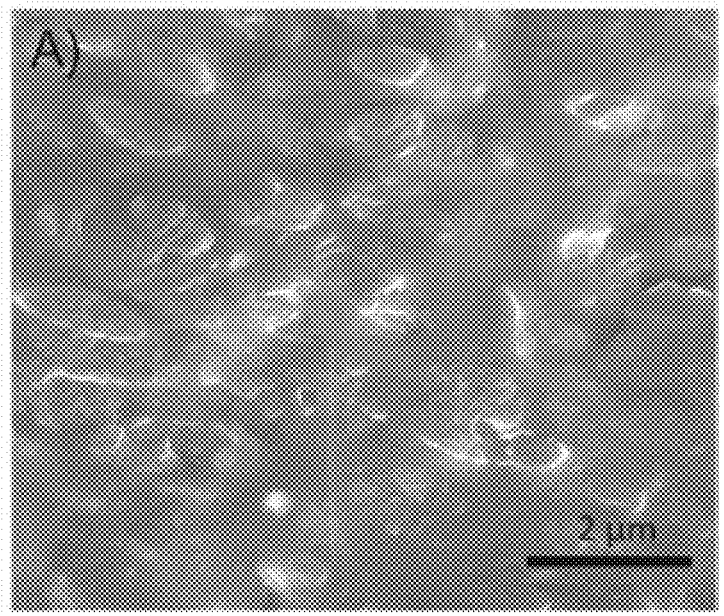
FIGS. 12A-12D. Scanning electron microscope (SEM) micrographs of cryogenically fractured surfaces of the four different blend compositions shown in FIG. 10 containing NBR having 41% acrylonitrile content blended with four different lignins: SW-A (FIG. 12A), SW-B (FIG. 12B), HW-A (FIG. 12C), and HW-B (FIG. 12D).
Figure 12B:
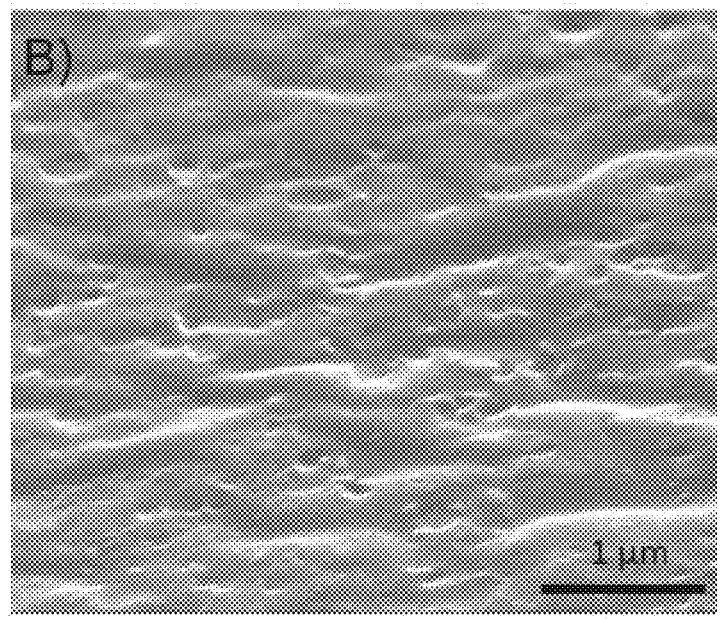
Figure 12C:
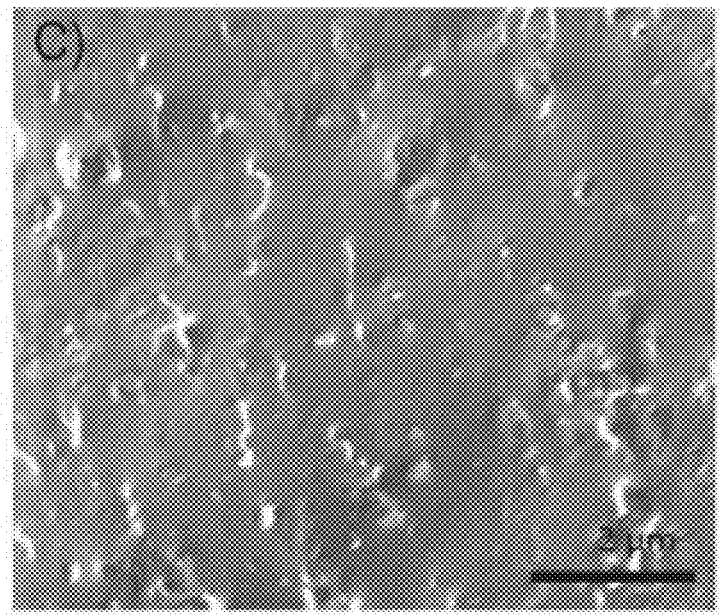
Figure 12D:
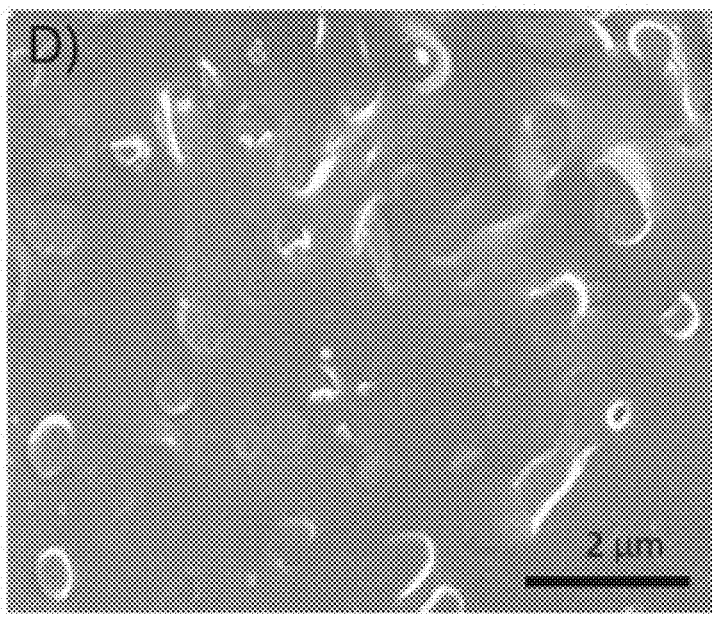

FIGS. 12A-12D are SEM micrographs of the four different blend compositions described above containing NBR having 41% acrylonitrile content blended with four different lignins: SW-A (FIG. 12A), SW-B (FIG. 12B), HW-A (FIG. 12C), and HW-B (FIG. 12D). FIGS. 12A-12D show the domain size of the dispersed lignin phase within the NBR matrix. As particularly shown by FIG. 12B (blend containing SW-B lignin), the SW-B phase is broken up into a smaller domain size of less than 200 nm and uniformly distributed throughout the NBR matrix, which is believed to arise by the noted second reaction. The other blends containing lignins other than SW-B exhibit larger domain sizes. However, for all blends, the compatibility of NBR containing 41% acrylonitrile content with lignin was much improved. This resulted in a much higher tensile strength, despite the fact that DCP or other crosslinking or curing agent was not used. Moreover, the blends still elongate at more than 100%, and the tensile set at 100% is less than 15%, which indicates elastomeric behavior. Overall, a higher acrylonitrile content has been shown to induce better compatibility between the rubber and lignin components.

Example 6

Producing Thermoplastics and Thermoplastic Elastomers by Blending Lignin with NBR Having a Higher Acrylonitrile Content of 41% at a Lignin Content of 60 wt %

Experimental

In an attempt to understand why blends containing softwood lignin B possess more thermoplastic characteristics, while other lignin sources exhibit characteristics of thermoplastic elastomers, the percentage of lignin in the rubber blends was increased. A hypothesis that may explain the difference in results between different lignins is that lignin sources other than SW-B may be less compatible (or interactive) or reactive, with NBR, thereby requiring a higher amount of lignin in order to acquire the adequate level of the interfacial reaction. In this experiment, rubber blends with 60% lignin and using different lignin sources were studied while keeping the rubber component (NBR with 41% acrylonitrile content) at 40%. In a typical experimental procedure, 10 g of NBR was placed in a Brabender mixer that was preheated to 160° C. and sheared at a rotor speed of 90 rpm. Then 15 g of lignin was added, mixed, and reacted with rubber for different amounts of time until the mixing torque curve became flattened. At the end of the mixing, samples were recovered and stored at room temperature. About 21 g of sample material was compression molded in a hydraulic press at 180° C. for 8 minutes at 5 metric tons of pressure. Dumbbell-shaped specimens were punched out of compression molded sheets and used for tensile testing.

Results

Figure 13:
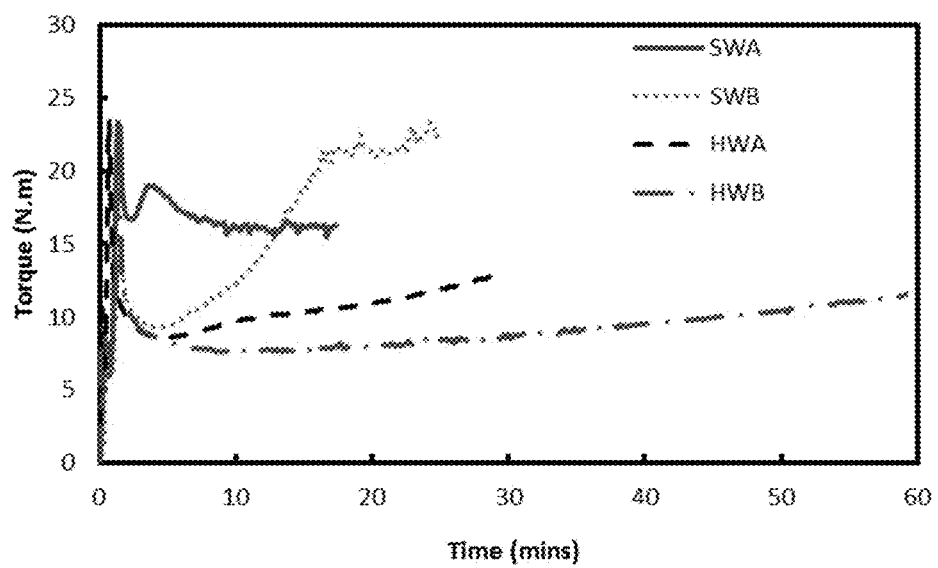
FIG. 13. Graph plotting torque vs. time during mixing for four different blends containing four different lignins (SW-A, SW-B, HW-A, and HW-B) in combination with NBR having 41% acrylonitrile content with lignin content at 60 wt %. The two lower curves are for HW lignins, and the two upper curves are for SW lignins.

FIG. 13 is a graph plotting torque vs. time during mixing for the four different blends described above containing four different lignins (SW-A, SW-B, HW-A, and HW-B) in combination with NBR having 41% acrylonitrile content with lignin content at 60 wt %. The two lower curves are for HW lignins, and the two upper curves are for SW lignins. As shown in FIG. 13, the torque increased remarkably during mixing of SW-B with NBR. In contrast, SW-A showed an initial increase in torque and behaved in the same manner as observed in the 50:50 weight ratios (Example 5). Notably, both HW-A and HW-B exhibited a slow increase in the torque over the whole period of mixing time. The curve for HW-A indicates a slight change in the slope of the torque, which may indicate a second step interaction or reaction.

Figure 14:
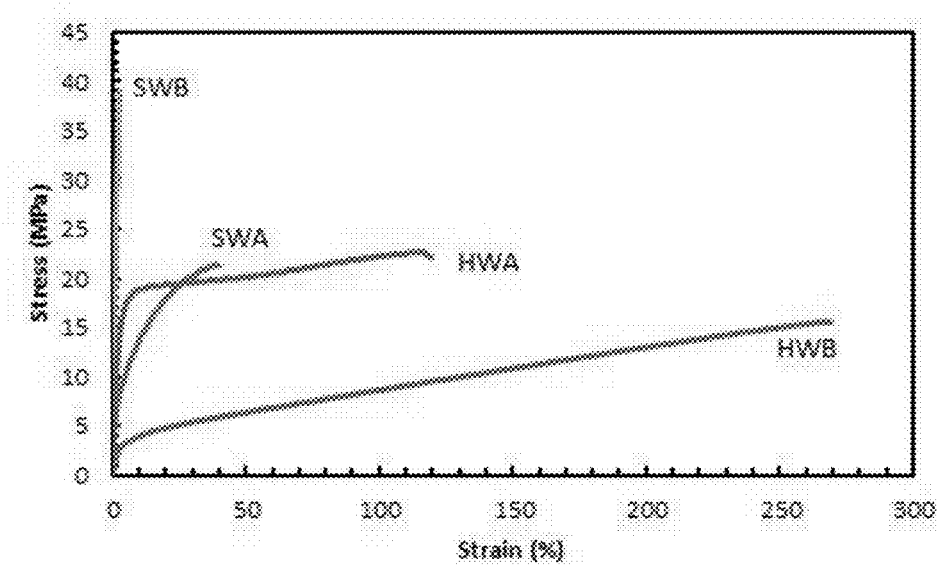
FIG. 14. Stress-strain curves of the four different blend compositions shown in FIG. 13 containing NBR having 41% acrylonitrile content blended with four different lignins (SW-A, SW-B, HW-A, and HW-B) with lignin content at 60 wt %.

Turning to FIG. 14, which shows the stress-strain characteristics of the four blends containing 60 wt % lignin, the blends containing either SW-B or HW-A exhibit characteristics of plastics, which correlates with the evolution of torque behavior noted above in FIG. 13. As further noted by the results in FIG. 13, the blend containing SW-B exhibited an extremely high tensile strength of 40 MPa but a very low elongation at break, which indicates a high level of brittleness. This composition can be further altered by incorporating additives, such as plasticizers, to enhance tensile toughness. Unlike the 50/50 mixture in Example 5, 60% HW-A in the rubber blend exhibited a very high initial slope with increasing strain. The foregoing result is consistent with the observation of a second step interaction or reaction that leads to torque rise during mixing. The mechanical properties in the 40:60 NBR:HW-B blend also improved, which correlates with the more pronounced interaction compared with the 50/50 mixture. The increase in percentage of SW-A in the rubber blend reduced the elongation at break significantly while there was little improvement in tensile strength compared to the 50/50 mixture in Example 5. In conclusion, softwood lignins surprisingly exhibit superior mechanical properties in the rubber blend at a 50/50 NBR-lignin ratio while hardwood lignins exhibit improved properties at a 40/60 NBR-lignin ratio.

Example 7

Producing Thermoplastic Elastomer with Improved Properties by Using Solvent Fractionated Softwood Lignin Experimental In an attempt to improve mechanical performance of elastomeric composition containing SW-A lignin, acetone/hexane (70/30) mix extracted lignin fraction of SW-A was used in 50/50 composition with NBR-41 (i.e., NBR with 41% acrylonitrile content) following similar mixing protocol discussed in Example 5.

Results

Figure 15:
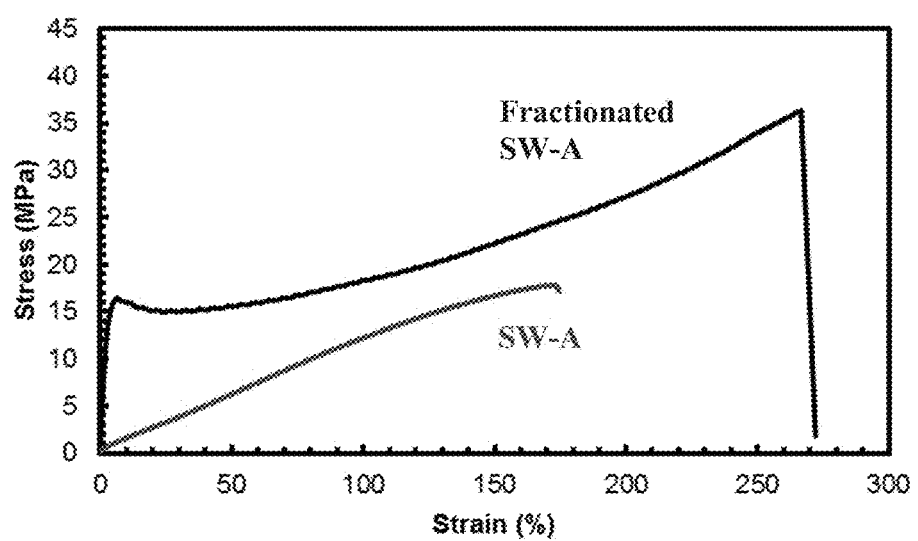
FIG. 15. Stress-strain curves of SW-A/NBR-41 blend and its equivalent composition containing low molecular weight acetone/hexane mix extracted lignin from SW-A.
Figure 16A:
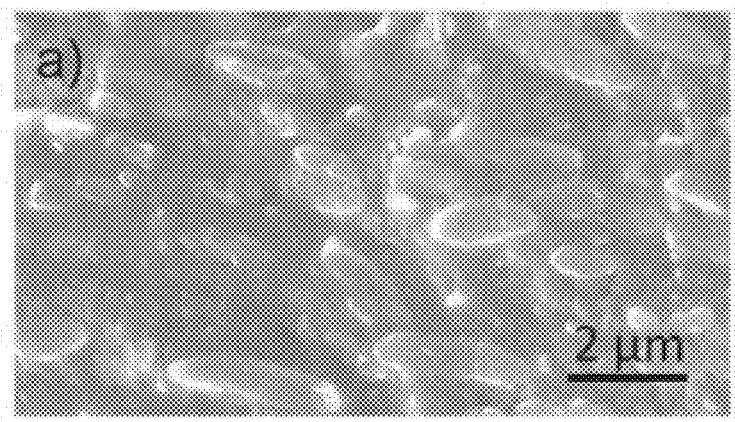
FIGS. 16A, 16B. SEM micrographs of cryogenically fractured surface of SW-A/NBR-41 (FIG. 16A) blend and its equivalent composition containing low molecular weight acetone/hexane mix extracted lignin from SW-A (FIG. 16B).
Figure 16B:
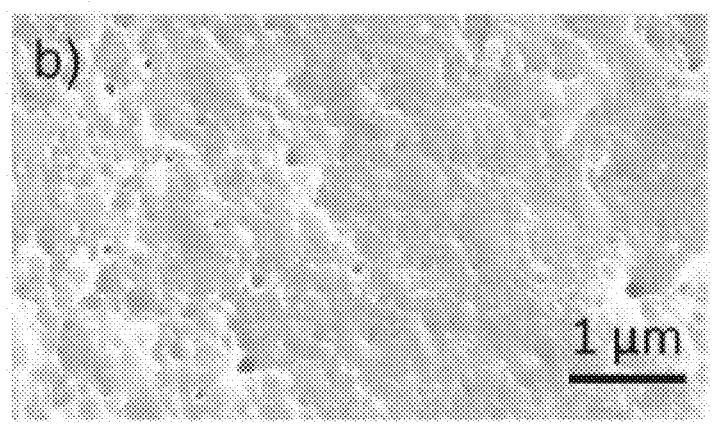

FIG. 15 shows the mechanical properties of elastomeric compositions of NBR-41 matrix containing SW-A and its acetone/hexane (70/30) mix extracted fraction. It is apparent that the malleable solvent extracted low-molecular weight fraction of SW-A forms a homogeneous mix that exhibits a yield stress and significantly enhanced ductility. This suggests that improved physical interaction between low-molecular weight fractions of SW-A allows it to behave as a thermoplastic elastomer. In contrast, SW-A/NBR-41 composition behaves more like a filled elastomer. This surprising result suggests high shear induced homogenization of low-molecular weight, low $T_g$ fraction of SW-A lignin in NBR-41 results in a significantly smaller dispersion of hard lignin phase in the soft NBR matrix, as evident in their cryo-fractured surface morphology observed under an SEM (FIGS. 16A and 16B for NBR-41 blends with SW-A and fractionated SW-A, respectively).

Example 8

Effect of Acrylonitrile Content in NBR on Properties of 50/50 Blends of NBR with Melt-Processible Softwood Lignin Experiment In an attempt to understand the effect of acrylonitrile content in NBR on properties of 50/50 blends with low $T_g$, melt-processible Kraft softwood lignin (SW-B), 33, 41, and 50 mol % acrylonitrile-containing NBRs were mixed with SW-B in different batches followed by molding and testing using protocol discussed in Example 5.

Results

Figure 17:
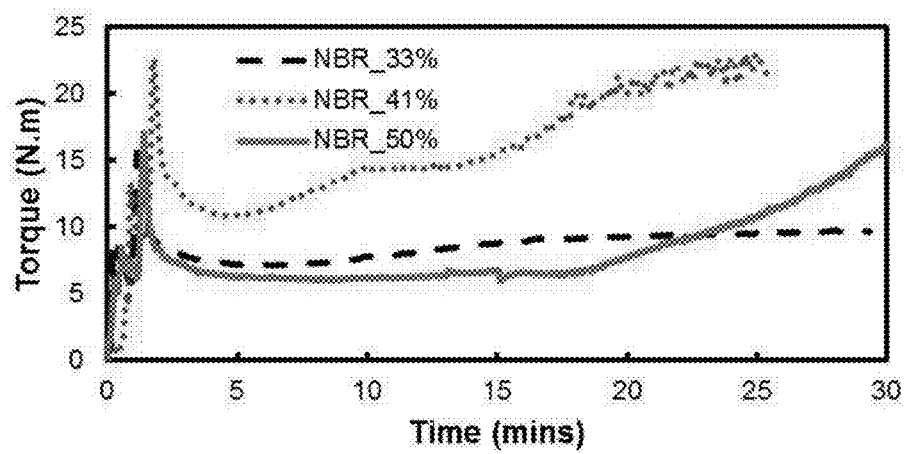
FIG. 17. Graph plotting torque vs. time during mixing of SW-B with a) NBR-33%, b) NBR-41%, and c) NBR-50% at 160° C. and 90 rpm.

In view of the importance of interfacial interaction or reaction, the acrylonitrile content of rubber was varied to determine its effect. In this case, the best performing lignin (SW-B) was mixed with rubbers with varying acrylonitrile content. As shown in FIG. 17, there is a significant rise in torque at 10 minutes when the acrylonitrile content is switched from 33% to 41%. This is accompanied by an increase in temperature as well. This sharp rise in temperature (not shown in FIG. 17) is most likely due to viscous heating and/or the reaction between lignin and rubber which imposes a resistance to rotation. Increasing the acrylonitrile content improves the compatibility, provides more interfacial interactions, and hence, increases the degree of reaction or interaction between lignin and rubber. As the reaction proceeds under intense shearing, lignin particles are exfoliated into smaller domain sizes and further provide reaction sites for bonding with rubber. As a result, there is a second step increase in torque at a later stage (about 15 minutes). Of further significance is that switching to an acrylonitrile content of 50% resulted in an unexpectedly different torque profile. The torque remains flat for a long period of time, indicating no reaction or interaction for the period. After that, there is a sudden increase in torque accompanied with a significant rise in temperature.

Figure 18A:
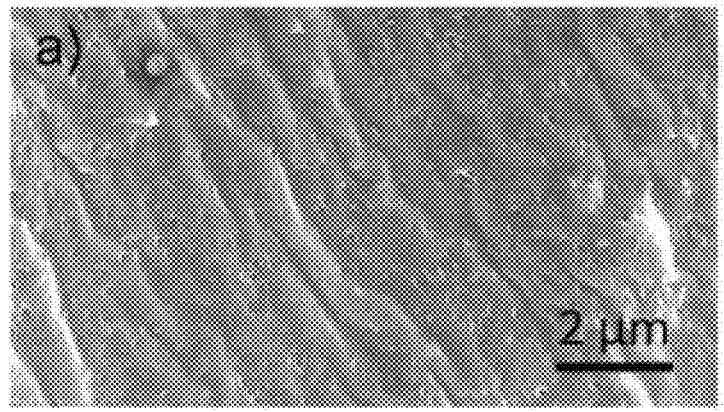
FIGS. 18A-18D. SEM micrographs of cryo-fractured blends of SW-B with NBR-41% (FIGS. 18A and 18B) and NBR-50% (FIGS. 18C and 18D) at different magnifications.
Figure 18B:
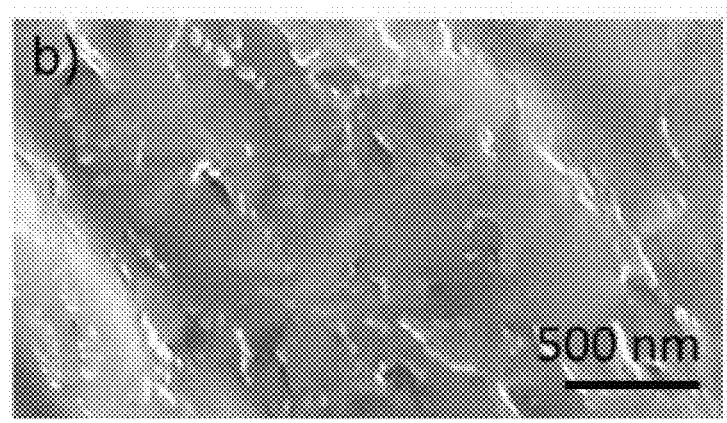
Figure 18C:
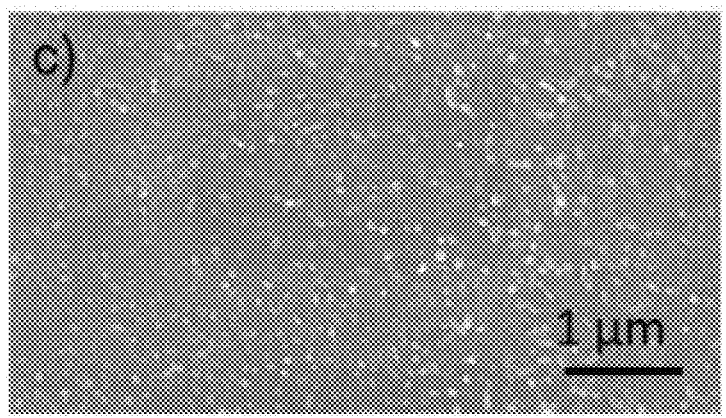
Figure 18D:
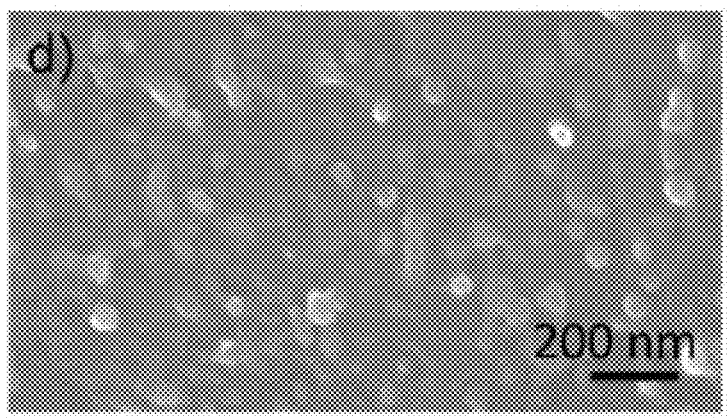

FIGS. 18A-18D show SEM micrographs of cryo-fractured blends of SW-B with NBR-41% (FIGS. 18A and 18B) and NBR-50% (FIGS. 18C and 18D) at different magnifications. There is no observable presence of micron-sized lignin particles (FIGS. 18A and 18C). Under high magnification, SW-B particles of less than 100 nm size appear to be connected to each other in NBR 41% matrix (FIG. 18 B). In the case of NBR 50%, the entire fractured surface is composed of tiny protruded particles of less than 50 nm (FIG. 18D). The boundary between the lignin and NBR 50% is not clearly distinguishable, indicating formation of truly homogenous blend.

Figure 7B:
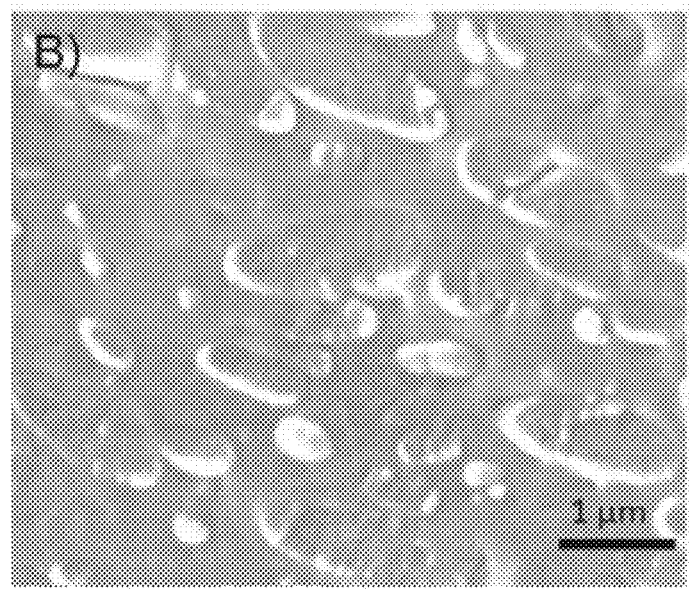
Figure 7C:
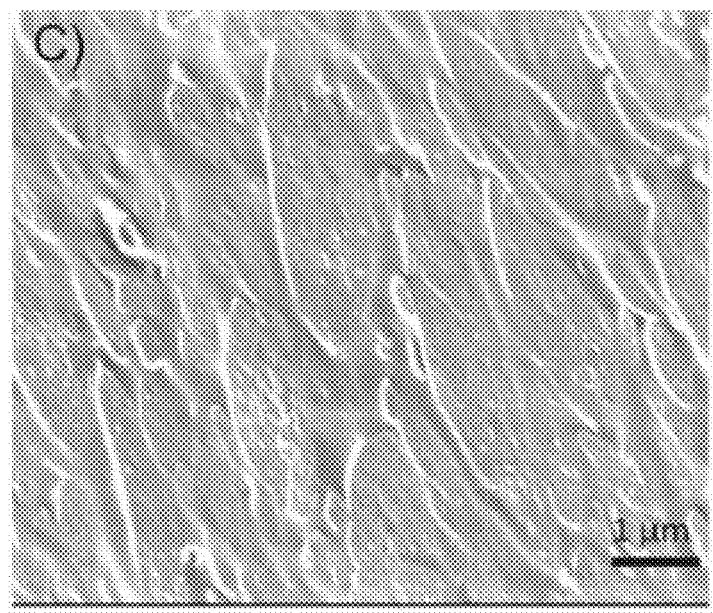
Figure 19A:
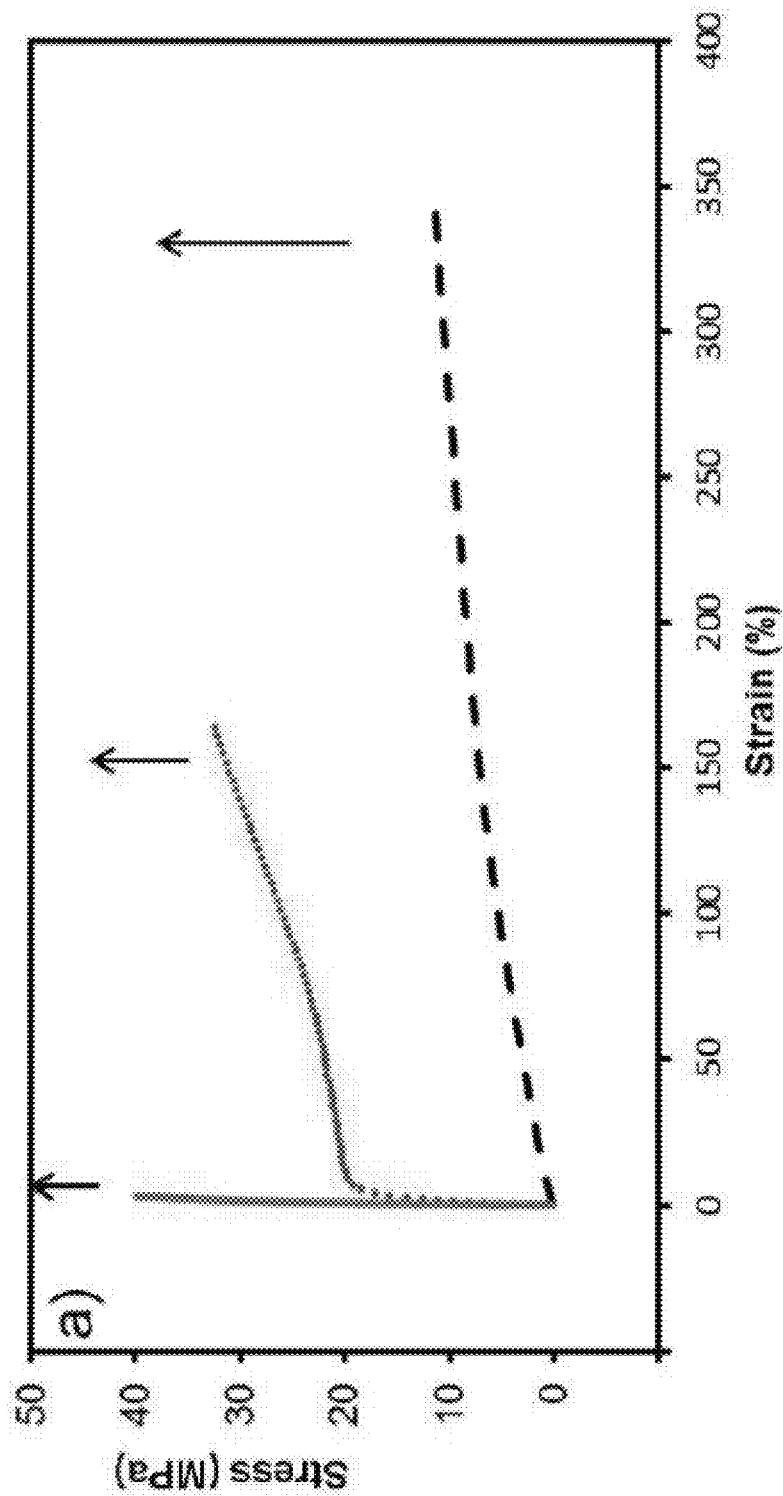
FIGS. 19A-19D. Tensile stress-strain curves of SW-B/NBR blend with either NBR-50%, NBR-41%, or NBR-33% (FIG. 19A) and their respective transmission electron microscopy (TEM) images (FIGS. 19B-19D).
Figure 19D:
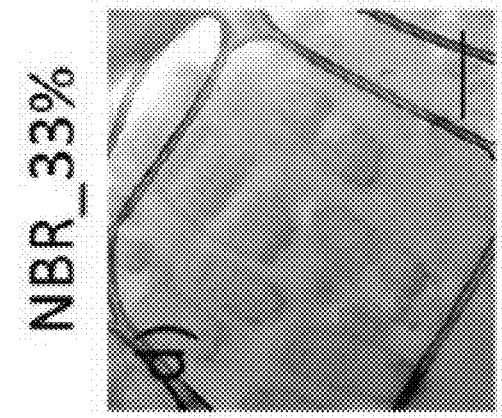
Figure 19C:
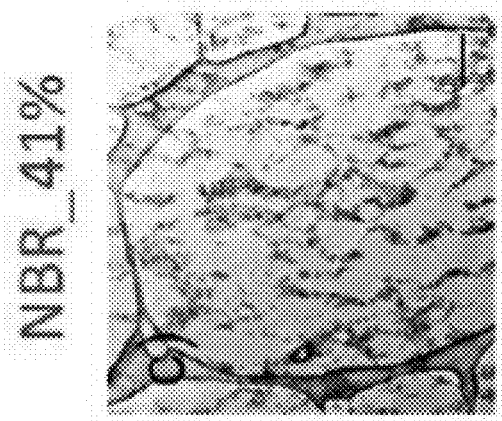

FIGS. 19A-D shows the dependence of acrylonitrile content in NBR and resulting morphologies of the NBR/SW-B blends on their tensile properties. Tensile stress-strain profiles are shown in FIG. 19A. Transmission Electron Micrograph (TEM) of SW-B lignin with NBR 33% (FIG. 19 D) confirmed the previous observation under SEM (FIG. 7B). The stress-strain curve of this mixture shows a typical behavior of a reinforced elastomer. The effectiveness of SW-B lignin as reinforcing agent is significantly higher than that shown in the prior study (Nigam, V., et al. *Journal of Materials Science*, 36, 43-47, 2001) with phenolic resin and comparable with carbon black at 50 phr in nitrile rubber. When SW-B is mixed with NBR-41%, TEM image shows an incredible interpenetrating network of SW-B lignin within the NBR matrix (FIG. 19C). The most striking feature of this network is the appearance of yield stress and strain hardening as shown in the stress-strain curve in FIG. 19A. The material exhibits an initial high modulus followed by a plateau and strain hardening upon stretching. The tensile strength greatly increases and reaches above 30 MPa. Such strain hardening is not common in filled elastomers, except natural rubber, which exhibits strain-induced crystallization, and has not been observed in any nitrile rubber. In a prior study, a pseudo-yielding point in NBR/silica blends was observed when NBR was mixed with silica in solution. However, such yielding behavior diminished in melt-mixed vulcanizates (Suzuki et al. J. Appl. Polym. Sci. 95: 74-81, 2005). The instant disclosure with exemplary composition of SW-B/NBR-41 50/50 prepared by melt mixing and without use of any crosslinking agent exhibited yield stress and strain hardening.

Figure 19B:
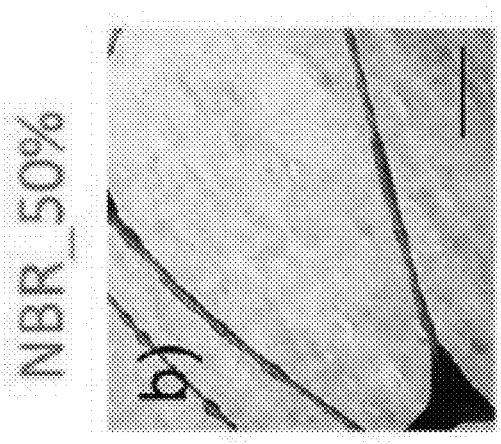

Based on the above, it is herein surmised that the prominent strain-hardening effect in the instant SW-B/NBR-41 composition is a result of alignment of networked lignin molecules in NBR 41%. The morphology further changes when NBR-50% is reacted or mixed with SW-B lignin (FIG. 19B). These two components form a nearly homogenous mixture. The material behaves like a brittle thermoplastic without any toughening action of the rubber. This specific composition (SW-B/NBR-50) can be further altered by incorporating additives, such as plasticizers, to enhance tensile toughness. Alternatively, toughness in the composition with NBR-50 can be enhanced by reducing lignin content (e.g., at lignin content <50%). Overall, it was unexpected that lignin-based materials with different morphologies and unique properties could be produced by using relatively malleable softwood lignin and NBR with high acrylonitrile content. Not all lignins are well suited to produce such behaviors. As shown in FIG. 12A, when high $T_g$ (less malleable) Kraft softwood lignin (SW-A) is mixed with NBR 41%, the morphology has dominant 1-2 µm sized lignin domains in contrast to the interpenetrating network observed with SW-B lignin.

Figure 20A:
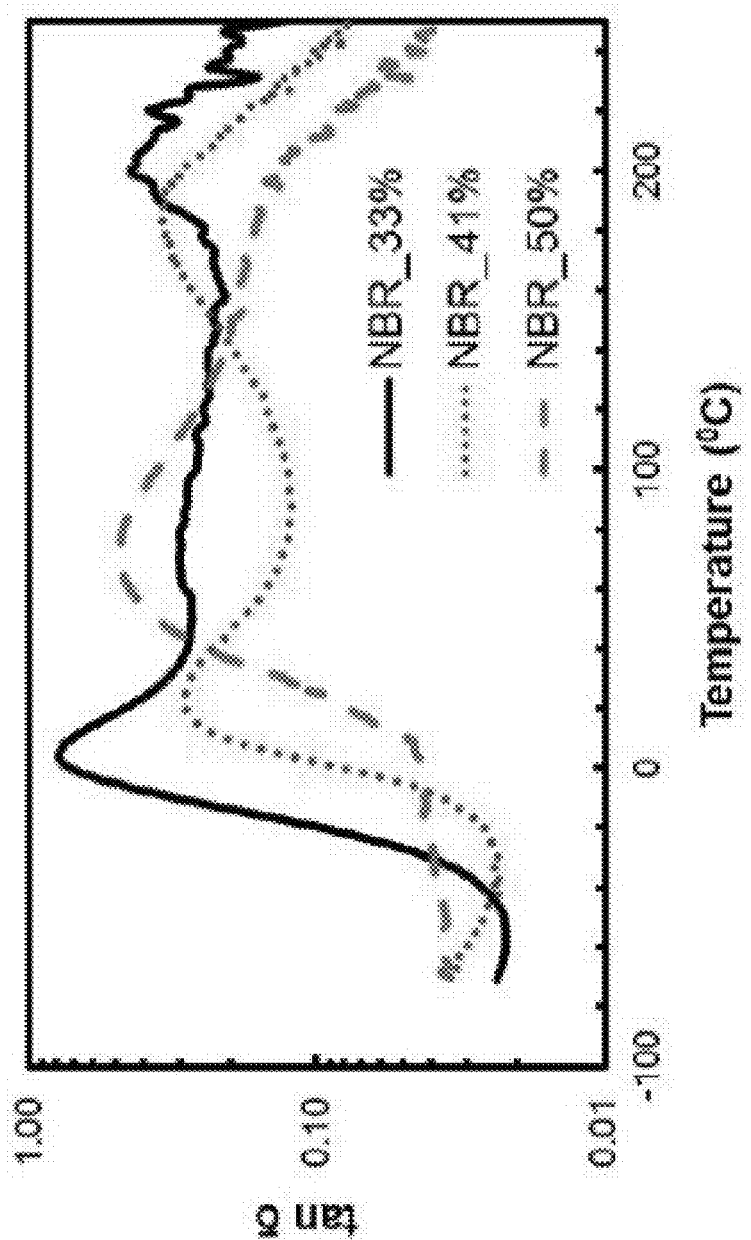
FIGS. 20A, 20B. Plots of loss tangent (tan δ) (FIG. 20A, top) and storage modulus (E') (FIG. 20B, bottom) versus temperature for mixtures of SW-B and NBR with different acrylonitrile content.
Figure 20B:
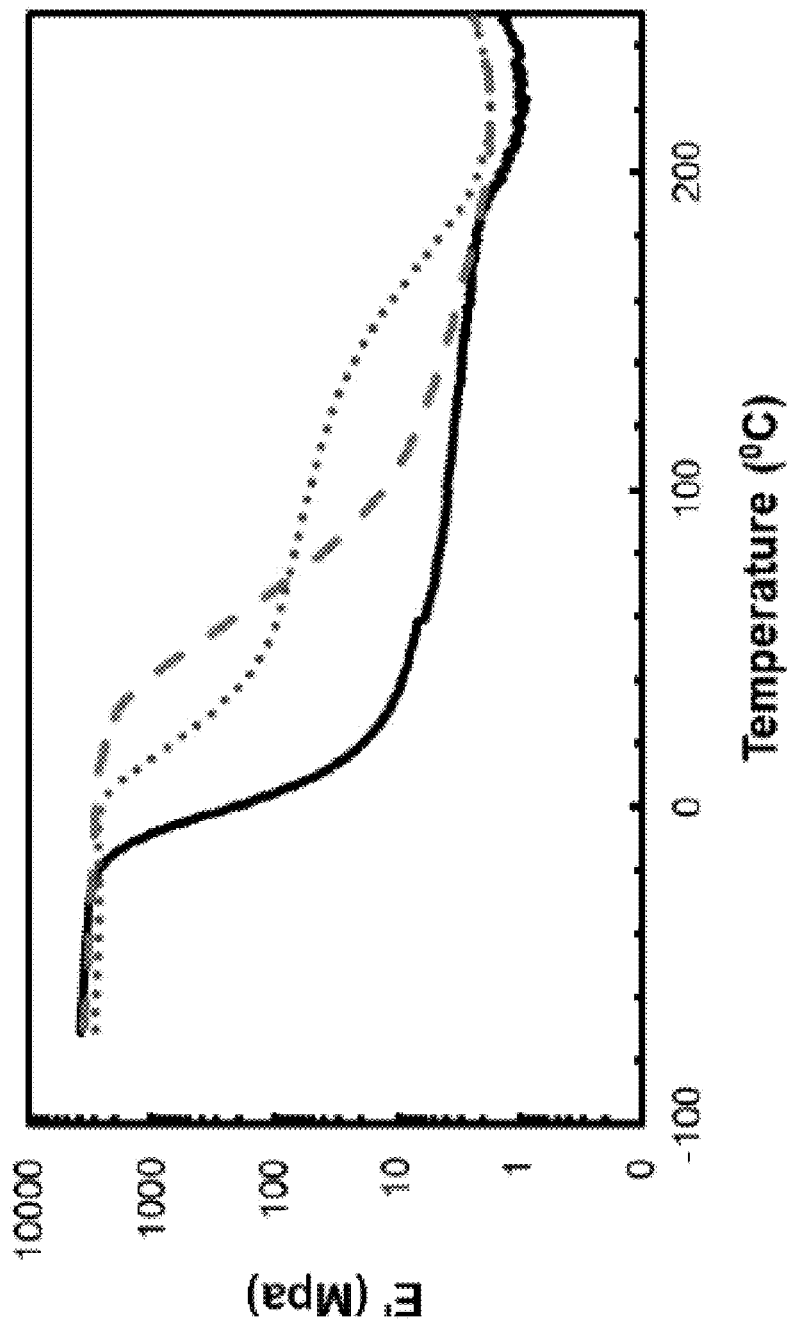

The effect of acrylonitrile content on the interfacial interaction of SW-B/NBR was further investigated by analyzing dynamical mechanical properties. FIGS. 20A, 20B show plots of loss tangent (tan δ) (FIG. 20A, top) and storage modulus (E') (FIG. 20B, bottom) versus temperature for mixtures of SW-B and NBR with different acrylonitrile content. As shown in FIGS. 20A and 20B, the SW-B/NBR-33% composition exhibits two separate loss tangent (tan δ) peaks at 0° C. and 198° C. corresponding to the glass transition ($T_g$) of NBR-33% and SW-B lignin, respectively. These two peaks are shifted inward and reduced in height upon switching to NBR-41%, indicating an increased miscibility between the two components. Further increasing acrylonitrile content to 50% produces a broad single peak at 60° C., which is between $T_g$s of SW-B and NBR-50%. These results suggest a possible formation of a nearly miscible phase region of SW-B/NBR-50% due to an increase in solubility or interaction between the components when acrylonitrile content is increased. The storage moduli (E') are almost unchanged in the glassy regions of the SW-B blends with nitrile rubbers. However, there is a substantial loss in E' in the rubbery region of the blend with NBR-33% while E' values of the blend with NBR-41% matrix remain relatively high over the whole range of temperature from 0 to 150° C. The E' values of the blend with NBR-50% are initially higher than that of NBR-41% but the values drop dramatically after 60° C. Therefore, SW-B/NBR-41% is not only suitable at room temperature due its toughness but also it performs well at high temperature without sacrificing stiffness. Such composition (SW-B/NBR-41%) is inherently immiscible but compatibilized in a way that retains characteristics of both lignin and NBR phases. On the other hand, the SW-B/NBR-50% blend forms a miscible phase that has limited temperature tolerance and it turns rubbery beyond 60° C.

A prior study shows that NBR vulcanizates containing 50 phr carbon black possess ~2 MPa tensile stress at 100% elongation (Nigam, V., et al. Journal of Materials Science 36, 43-47, 2001). The instant disclosure shows that all softwood lignins (SW-A and SW-B) at 50% loadings result in greater than 5 MPa tensile stress at 100% elongation with NBR-33 (FIG. 9) and NBR-41 (FIG. 11). On the other hand, all hardwood lignins (HW-A and HW-B) at 50% and 60% loadings in NBR-41 result in greater than 5 MPa tensile stress at 100% elongation (FIG. 11 and FIG. 14, respectively). These results are due to an unexpectedly improved lignin-NBR interaction achieved by controlling material characteristics and process parameters (NBR type, lignin type, mixing time, and temperature).

Notably, acrylonitrile butadiene styrene (ABS) is a well-known engineering thermoplastic that forms a multi-phase material in which acrylonitrile butadiene rubber stays as a soft domain and styrene-acrylonitrile matrix contributes as a rigid segment. Here, in the newly formulated compositions (SW-B/NBR-41 and SW-B/NBR-50), depolymerizable styrene segments were successfully replaced by lignin, a renewable resource macromer. Using high shear along with intense heat treatment, lignin has herein been exfoliated and combined with nitrile rubber to form a multiphase material. The as-formed material, specifically SW-B/NBR-41, not only exhibits an equivalent strength similar to ABS, but also possesses significantly improved toughness. ABS only elongates less than 10% while SW-B/NBR-41 has an elongation at break well above 100%. These unique properties from materials with 50% carbon neutral content provide a significant beneficial economic and societal impact and open a new path for increased biomass use.

While there have been shown and described what are at present considered the preferred embodiments of the invention, those skilled in the art may make various changes and modifications which remain within the scope of the invention defined by the appended claims.

What is claimed is:

1. A polymer blend material comprising:
   (i) a lignin component having a weight-average molecular weight of up to 1,000,000 g/mol; and
   (ii) an acrylonitrile-containing copolymer rubber component comprising acrylonitrile units in combination with diene monomer units, and having an acrylonitrile content of at least 20 mol %;
   wherein said lignin component is present in an amount of at least 5 wt % and up to about 95 wt % by total weight of components (i) and (ii);
   wherein said polymer blend material excludes a modifying agent selected from carbon particles, ether-containing polymers, and Lewis acid compounds; and
   said polymer blend material possesses either a tensile yield stress of at least 5 MPa, or a tensile stress of at least 5 MPa at 10% elongation, or a tensile stress of at least 5 MPa at 100% elongation.

2. The polymer blend material of claim 1, wherein said acrylonitrile content is at least 30 mol %.

3. The polymer blend material of claim 1, wherein said acrylonitrile content is at least 35 mol %.

4. The polymer blend material of claim 1, wherein said acrylonitrile content is at least 40 mol %.

5. The polymer blend material of claim 1, wherein said lignin is a softwood lignin, a hardwood lignin, or a grass-derived lignin.

6. The polymer blend material of claim 1, wherein said lignin has a weight-average molecular weight of up to 10,000 g/mol.

7. The polymer blend material of claim 1, wherein said lignin component is present in an amount of at least 20 wt % and up to about 60 wt % by total weight of components (i) and (ii).

8. The polymer blend material of claim 1, wherein said lignin component is present in an amount of at least 30 wt % and up to about 50 wt % by total weight of components (i) and (ii).

9. The polymer blend material of claim 1, wherein said lignin component is dispersed in said acrylonitrile-containing copolymer rubber component in the form of domains having a size of up to about 2000 nm.

10. The polymer blend material of claim 1, wherein said lignin component is dispersed in said acrylonitrile-containing copolymer rubber component in the form of domains having a size of up to about 1000 nm.

11. The polymer blend material of claim 1, wherein said lignin component is dispersed in said acrylonitrile-containing copolymer rubber component in the form of domains having a size of up to about 100 nm.

12. The polymer blend material of claim 1, wherein said polymer blend material possesses a tensile yield stress of at least 10 MPa.

13. The polymer blend material of claim 1, wherein said polymer blend material possesses a tensile stress of at least 10 MPa at 10% elongation.

14. The polymer blend material of claim 1, wherein said polymer blend material possesses an ultimate elongation of at least 50%.

15. The polymer blend material of claim 1, wherein said polymer blend material possesses an ultimate elongation of at least 100%.

16. The polymer blend material of claim 1, wherein said polymer blend material possesses a tensile stress of at least 10 MPa at 100% elongation.

17. The polymer blend material of claim 1, wherein said polymer blend material exhibits strain hardening during stretching beyond yield strain to ultimate failure.

18. A method for producing a polymer blend material, the method comprising homogeneously blending a mixture comprising:
(i) a lignin component having a weight-average molecular weight of up to 1,000,000 g/mol; and
(ii) an acrylonitrile-containing copolymer rubber component comprising acrylonitrile units in combination with diene monomer units, and having an acrylonitrile content of at least 20 mol %;
wherein said blending is conducted at a temperature of at least 100° C. and up to 200° C., at a shear rate of about 10 to 1000 s$^{-1}$, and for a time of about 5 to 45 minutes;
wherein said lignin component is present in an amount of at least 5 wt % and up to about 95 wt % by total weight of components (i) and (ii);
wherein said mixture and resulting polymer blend material exclude a modifying agent selected from carbon particles, silicon-containing particles, ether-containing polymers, and Lewis acid compounds; and
said polymer blend material possesses either a tensile yield stress of at least 5 MPa, or a tensile stress of at least 5 MPa at 10% elongation, or a tensile stress of at least 5 MPa at 100% elongation.

19. The method of claim 18, wherein said temperature is at least 130° C. and up to 170° C.

20. The method of claim 18, wherein said acrylonitrile content is at least 30 mol %.

21. The method of claim 18, wherein said acrylonitrile content is at least 35 mol %.

22. The method of claim 18, wherein said acrylonitrile content is at least 40 mol %.

23. The method of claim 18, wherein said lignin is a softwood lignin, a hardwood lignin, or a grass-derived lignin.

24. The method of claim 18, wherein said lignin has a weight-average molecular weight of up to 10,000 g/mol.

25. The method of claim 18, wherein said lignin component is present in an amount of at least 20 wt % and up to about 60 wt % by total weight of components (i) and (ii).

26. The method of claim 18, wherein said lignin component is present in an amount of at least 30 wt % and up to about 50 wt % by total weight of components (i) and (ii).

27. The method of claim 18, wherein said polymer blend material contains said lignin component dispersed in said acrylonitrile-containing copolymer rubber component in the form of domains having a size of up to about 2000 nm.

28. The method of claim 18, wherein said polymer blend material contains said lignin component dispersed in said acrylonitrile-containing copolymer rubber component in the form of domains having a size of up to about 1000 nm.

29. The method of claim 18, wherein said polymer blend material contains said lignin component dispersed in said acrylonitrile-containing copolymer rubber component in the form of domains having a size of up to about 100 nm.

30. The method of claim 18, wherein said polymer blend material possesses a tensile yield stress of at least 10 MPa.

31. The method of claim 18, wherein said polymer blend material possesses a tensile stress of at least 10 MPa at 10% elongation.

32. The method of claim 18, wherein said polymer blend material possesses an ultimate elongation of at least 50%.

33. The method of claim 18, wherein said polymer blend material exhibits strain hardening during stretching beyond yield strain to ultimate failure.

34. The method of claim 18, wherein said mixture further includes a radical crosslinking agent.

35. The method of claim 18, further comprising subjecting the blended mixture of components (i) and (ii) to a shape-forming process to form a solid shaped article of said polymer blended material.

36. A plate or sheet comprising the polymer blend material of claim 1.

37. An article comprising the polymer blend material of claim 1.

38. The article of claim 37, wherein the article is a plate or sheet.

* * * * *